US010165650B1

United States Patent
Fini et al.

(10) Patent No.: US 10,165,650 B1
(45) Date of Patent: Dec. 25, 2018

(54) OCCUPANT TRACKING

(71) Applicant: Cree, Inc., Durham, NC (US)

(72) Inventors: Paul Fini, Santa Barbara, CA (US); Ronald W. Bessems, Santa Barbara, CA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/681,941

(22) Filed: Aug. 21, 2017

(51) Int. Cl.
*H05B 37/02* (2006.01)

(52) U.S. Cl.
CPC .................................. *H05B 37/02* (2013.01)

(58) Field of Classification Search
CPC .. H05B 41/325; H05B 41/3922; H05B 41/32; H05B 39/042; H05B 33/0869; H05B 3/38; H05B 33/08; H05B 37/0272; H05B 37/02; H05B 37/0227; H05B 37/0218; H05B 39/081; G03B 15/05; F21V 23/0442; G05B 11/017; G06T 2207/10016; G06T 7/2033; G06T 7/20; G06K 9/3241; G06K 9/00771; G08B 13/193; Y02B 20/46; Y02B 20/14; H01H 47/24; H01J 40/14; H01J 17/04
See application file for complete search history.

(56) References Cited

U.S. PATENT DOCUMENTS

| 6,185,444 | B1 | 2/2001 | Ackerman et al. |
| 9,686,477 | B2 | 6/2017 | Walters et al. |
| 9,706,617 | B2 | 7/2017 | Carrigan et al. |
| 9,710,691 | B1 | 7/2017 | Hatcher et al. |
| 9,769,900 | B2 | 9/2017 | Underwood et al. |
| 9,888,546 | B2 | 2/2018 | Deese et al. |
| 2008/0273754 | A1 | 11/2008 | Hick et al. |
| 2009/0262189 | A1 | 10/2009 | Marman |
| 2009/0290765 | A1 | 11/2009 | Ishii et al. |
| 2010/0182294 | A1 | 6/2010 | Roshan et al. |

(Continued)

FOREIGN PATENT DOCUMENTS

JP 2012243206 A 12/2012

OTHER PUBLICATIONS

Berclaz, J., et al., "Robust People Tracking with Global Trajectory Optimization," IEEE Computer Society Conference on Computer Vision and Pattern Recognition, Jun. 17-22, 2006, New York, New York, USA, 7 pages.

(Continued)

*Primary Examiner* — Minh D A
(74) *Attorney, Agent, or Firm* — Withrow & Terranova, P.L.L.C.

(57) ABSTRACT

A lighting fixture has a communication interface; a light source configured to provide light output for general illumination; an image sensor configured to capture image information associated of with a field of view; and control circuitry, which is configured to provide a drive signal to the light source to control the light output. In one embodiment, the control circuitry is further configured to, for each object in the field of view, determine if an object in the field of view is an occupant based on the image information; if the object is an occupant, track movement of the occupant within the field of view; and determine a number of occupants in the field of view. The control circuitry may also be configured to provide occupancy information bearing on the number of occupants in the field of view to a remote entity via the communication interface.

21 Claims, 16 Drawing Sheets

(56) References Cited

U.S. PATENT DOCUMENTS

| | | |
|---|---|---|
| 2010/0262296 A1 | 10/2010 | Davis et al. |
| 2010/0295946 A1 | 11/2010 | Reed et al. |
| 2011/0211758 A1 | 9/2011 | Joshi et al. |
| 2012/0143357 A1 | 6/2012 | Chemel et al. |
| 2012/0235579 A1 | 9/2012 | Chemel et al. |
| 2013/0307419 A1 | 11/2013 | Simonian et al. |
| 2014/0001963 A1 | 1/2014 | Chobot et al. |
| 2014/0072211 A1 | 3/2014 | Kovesi et al. |
| 2014/0340570 A1 | 11/2014 | Meyers et al. |
| 2015/0008831 A1 | 1/2015 | Carrigan et al. |
| 2015/0305119 A1 | 10/2015 | Hidaka et al. |
| 2015/0373808 A1 | 12/2015 | Kuo et al. |
| 2016/0100086 A1 | 4/2016 | Chien |
| 2017/0185057 A1* | 6/2017 | Ashdown ............. G05B 19/042 |
| 2017/0228874 A1 | 8/2017 | Roberts |
| 2017/0231066 A1 | 8/2017 | Roberts et al. |

OTHER PUBLICATIONS

Buckley, J. P., et al., "The sedentary office: an expert statement on the growing case for change towards better health and productivity," British Journal of Sports Medicine, vol. 49, Mar. 26, 2015, pp. 1357-1362.

Dalal, N., et al., "Histograms of Oriented Gradients for Human Detection," IEEE Computer Society Conference on Computer Vision and Pattern Recognition, Jun. 20-25, 2005, San Diego, California, USA, 8 pages.

Girod, L., et al., "Locating Tiny Sensors in Time and Space: A Case Study," Proceedings of the 2002 IEEE International Conference on Computer Design: VLSI in Computers and Processors, Sep. 16-18, 2002, Freiberg, Germany, pp. 214-219.

Hnat, T., et al., "Doorjamb: Unobtrusive Room-level Tracking of People in Homes using Doorway Sensors," Proceedings of the 2012 Sensys: The ACM Conference on Embedded Networked Sensor Systems, Nov. 6-9, 2012, Toronto, Canada, 14 pages.

Hella Aglaia, "APS-90 Advanced People Counting Sensor Data Sheet," HELLA Aglaia Mobile Vision GmbH, Available online at: <<http://people-sensing.com/wp-content/uploads/2017/08/2017_11_Factsheet_APS-90E_EN_web.pdf>>, Nov. 2017, 1 page.

Jia, J., et al., "Image Stitching Using Structure Deformation," IEEE Transactions on Pattern Analysis and Machine Intelligence, vol. 30, No. 4, Apr. 2008, pp. 617-631.

Kalman, R. E., "A New Approach to Linear Filtering and Prediction Problems," Transactions of the ASME—Journal of Basic Engineering, vol. 82, Series D, Jan. 1960, 12 pages.

Kamthe, A., et al., "SCOPES: Smart Cameras Object Position Estimation System," Proceedings of the 2009 European Conference on Wireless Sensor Networks, IN: Roedig, U., et al. (eds.), Lecture Notes in Computer Science, vol. 5432, Springer, 2009, pp. 279-295.

Kulkarn I, P., et al., "Senseye: A multi-tier camera sensor network," Proceedings of the 2005 13th Annual ACM International Conference on Multimedia, Nov. 6-12, 2005, Singapore, Singapore, pp. 229-238.

Mathew, M., et al., "Sparse, Quantized, Full Frame CNN for Low Power Embedded Devices," 2017 IEEE Conference on Computer Vision and Pattern Recognition Workshops (CVPRW), Jul. 21-26, 2017, Honolulu, Hawaii, USA, 9 pages.

Patwari, N., et al., "Relative Location Estimation in Wireless Sensor Networks," IEEE Transactions on Signal Processing, vol. 51, No. 8, Aug. 2003, pp. 2137-2148.

Satpathy, A., et al., "Human Detection by Quadratic Classification on Subspace of Extended Histogram of Gradients," IEEE Transactions on Image Processing, vol. 23, No. 1, Jan. 2014, 11 pages.

Szeliski, R., "Image Alignment and Stitching: A Tutorial," Foundations and Trends in Computer Graphics and Vision, vol. 2, No. 1, 2006, pp. 1-104.

Zeng, C., et al., "Robust Head-shoulder Detection by PCA-Based Multilevel HOG-LBP Detector for People Counting," 2010 International Conference on Pattern Recognition, Aug. 23-26, 2010, Istanbul, Turkey, 4 pages.

Zhu, Q., et al., "Fast Human Detection Using a Cascade of Histograms of Oriented Gradients," IEEE Computer Society Conference on Computer Vision and Pattern Recognition, Jun. 17-22, 2005, New York, New York, USA, 8 pages.

Zomet, A., et al., "Seamless Image Stitching by Minimizing False Edges," IEEE Transactions on Image Processing, vol. 15, No. 4, Apr. 2006, pp. 969-977.

Non-Final Office Action for U.S. Appl. No. 14/623,314, dated Oct. 6, 2016, 13 pages.

Non-Final Office Action for U.S. Appl. No. 15/191,753, dated Aug. 1, 2018, 11 pages.

* cited by examiner

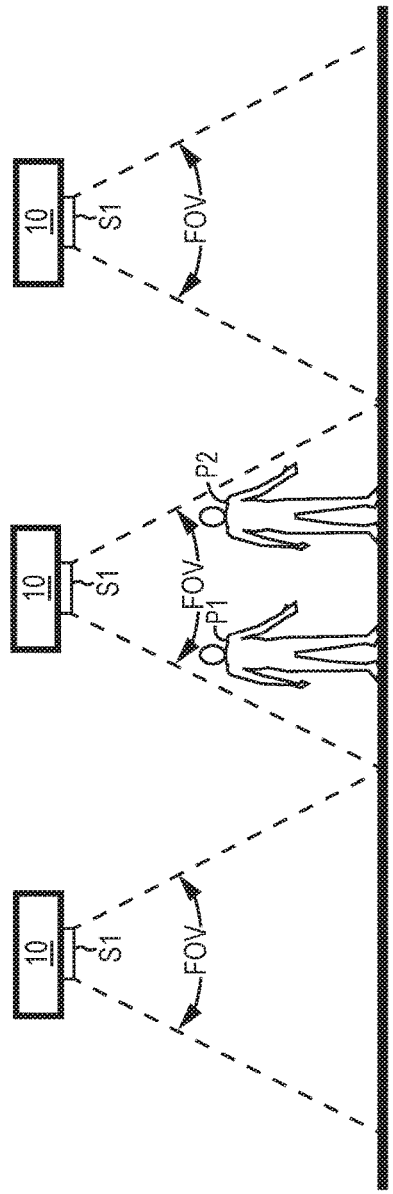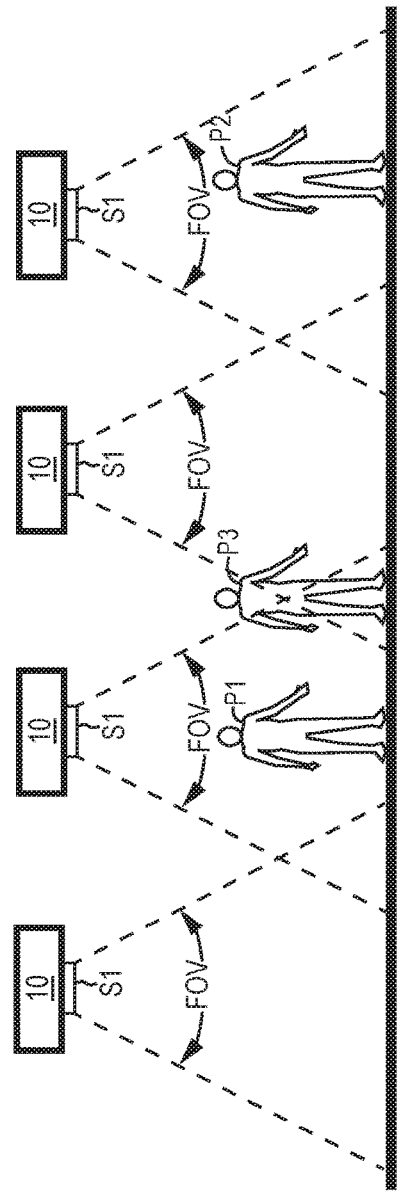

- - - - FOV BOUNDARY

OCCUPANT TRACKING

FIELD OF THE DISCLOSURE

The present disclosure relates to lighting fixtures, and in particular to an intelligent lighting module for lighting fixtures.

BACKGROUND

In recent years, a movement has gained traction to replace incandescent light bulbs with lighting fixtures that employ more efficient lighting technologies, as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based lighting fixtures are much more efficient at converting electrical energy into light, are longer lasting, and are also capable of producing light that is very natural. Compared with fluorescent lighting, LED-based fixtures are not only more efficient, but are also capable of producing light that is much more natural and more capable of accurately rendering colors. As a result, lighting fixtures that employ LED technologies are replacing incandescent and fluorescent bulbs in residential, commercial, and industrial applications.

Unlike incandescent bulbs that operate by subjecting a filament to a desired current, LED-based lighting fixtures require electronics to drive one or more LEDs. The electronics generally include a power supply and special control circuitry to provide uniquely configured drive signals that are required to drive the one or more LEDs in a desired fashion. The presence of the control circuitry adds a potentially significant level of intelligence to the lighting fixtures that can be leveraged to employ various types of lighting control. Such lighting control may be based on various environmental conditions, such as ambient light and occupancy.

SUMMARY

The present disclosure relates to a lighting fixture having a communication interface; a light source configured to provide light output for general illumination; an image sensor configured to capture image information associated with a field of view; and control circuitry, which is configured to provide a drive signal to the light source to control the light output. In one embodiment, the control circuitry is further configured to, for each object in the field of view, determine if an object in the field of view is an occupant based on the image information; if the object is an occupant, track movement of the occupant within the field of view; and determine a number of occupants in the field of view. The control circuitry may also be configured to provide occupancy information bearing on the number of occupants in the field of view to a remote entity via the communication interface.

In one embodiment, if there is no indication of occupancy, the control circuitry communicates with at least one neighboring lighting fixture via the communication interface to determine if the occupant is in the field of view of the at least one neighboring lighting fixture. If the occupant is in the field of view of the at least one neighboring lighting fixture, the control circuitry communicates with the at least one neighboring lighting fixture via the communication interface to facilitate a handoff of tracking of the movement of the occupant to the at least one neighboring lighting fixture. The control circuitry may also provide occupant information that relates to the occupant and is derived from the image information to the at least one neighboring lighting fixture via the communication interface in association with the handoff.

In one embodiment, while tracking the movement of the occupant, the control circuitry is further configured to: predict if the occupant is leaving the field of view, and if the occupant is predicted to be leaving the field of view, communicate with at least one neighboring lighting fixture via the communication interface to facilitate a handoff of tracking of the movement of the occupant to the at least one neighboring lighting fixture. While tracking the movement of the occupant, the control circuitry may be configured to, if the occupant is not leaving the field of view, resume tracking of the movement of the occupant within the field of view. To predict if the occupant is leaving the field of view, the control circuitry may be configured to determine at least one of a location of the occupant within the field of view, a direction of travel of the occupant, and a velocity of travel of the occupant; and use the at least one of the location of the occupant within the field of view, in the direction of travel of the occupant, and the velocity of travel of the occupant to predict if the occupant is leaving the field of view. The control circuitry may be configured to provide occupant information that relates to the occupant and is derived from the image information to the at least one neighboring lighting fixture via the communication interface in association with the handoff.

In one embodiment, the control circuitry is further configured to detect motion in the field of view caused by an object moving in the field of view; determine whether the object moving in the field of view is a previously tracked occupant; and if the object moving in the field of view is a previously tracked occupant, resume tracking of the previously tracked occupant, wherein determining if the object in the field of view is an occupant is initiated when the object moving in the field of view is not a previously tracked occupant.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 7A and 7B illustrate fields of view for two different lighting environments.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Prior to delving into the details of the present disclosure, an overview of an exemplary lighting fixture incorporating the concepts described above is provided. While the concepts of the present disclosure may be employed in any type of lighting system, the immediately following description describes these concepts in a troffer-type lighting fixture, such as the lighting fixture 10 illustrated in FIGS. 1-3. This particular lighting fixture is substantially similar to the CR and CS series of troffer-type lighting fixtures that are manufactured by Cree, Inc. of Durham, N.C.

Figure 1:
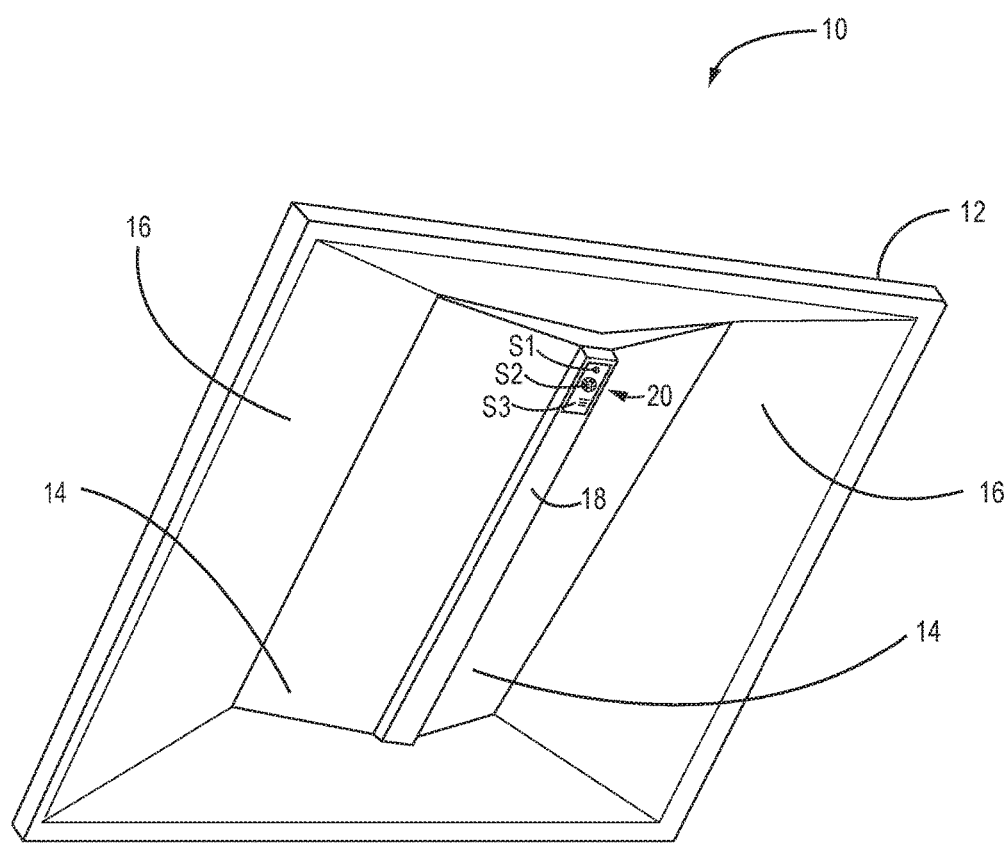
FIG. 1 is a perspective view of a troffer-based lighting fixture according to one embodiment of the disclosure.
Figure 2:
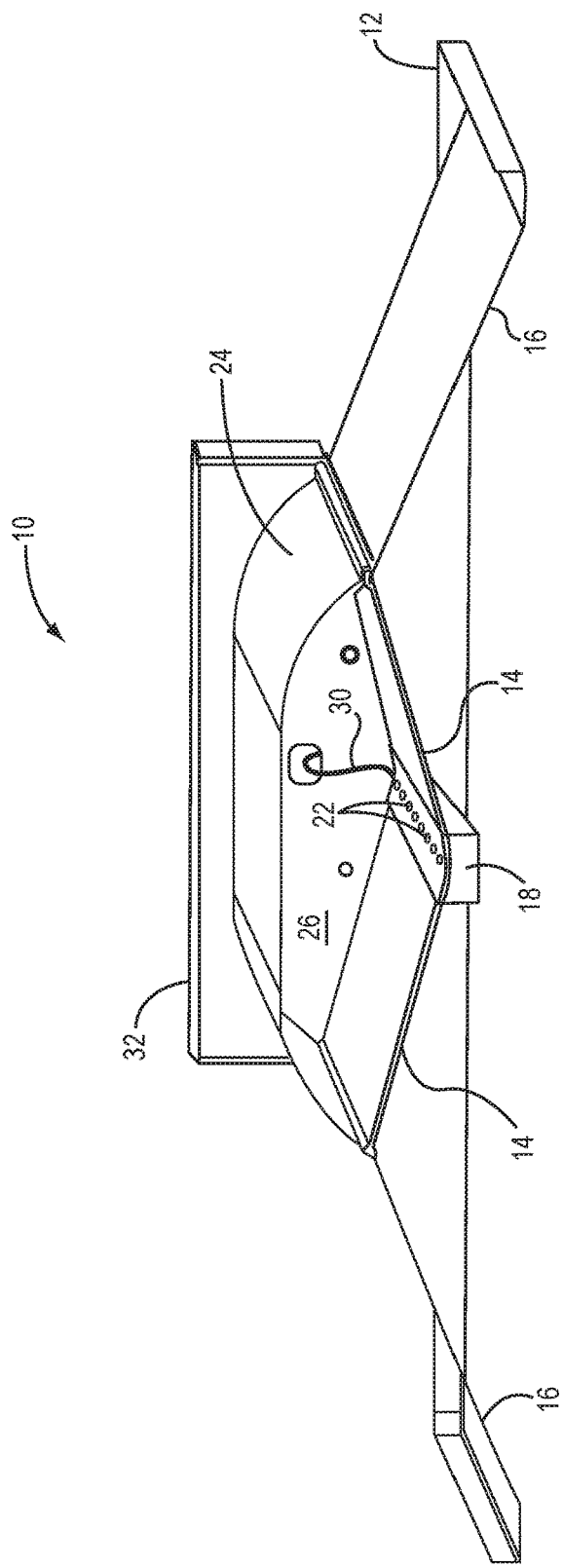
FIG. 2 is a cross-section of the lighting fixture of FIG. 1.
Figure 3:
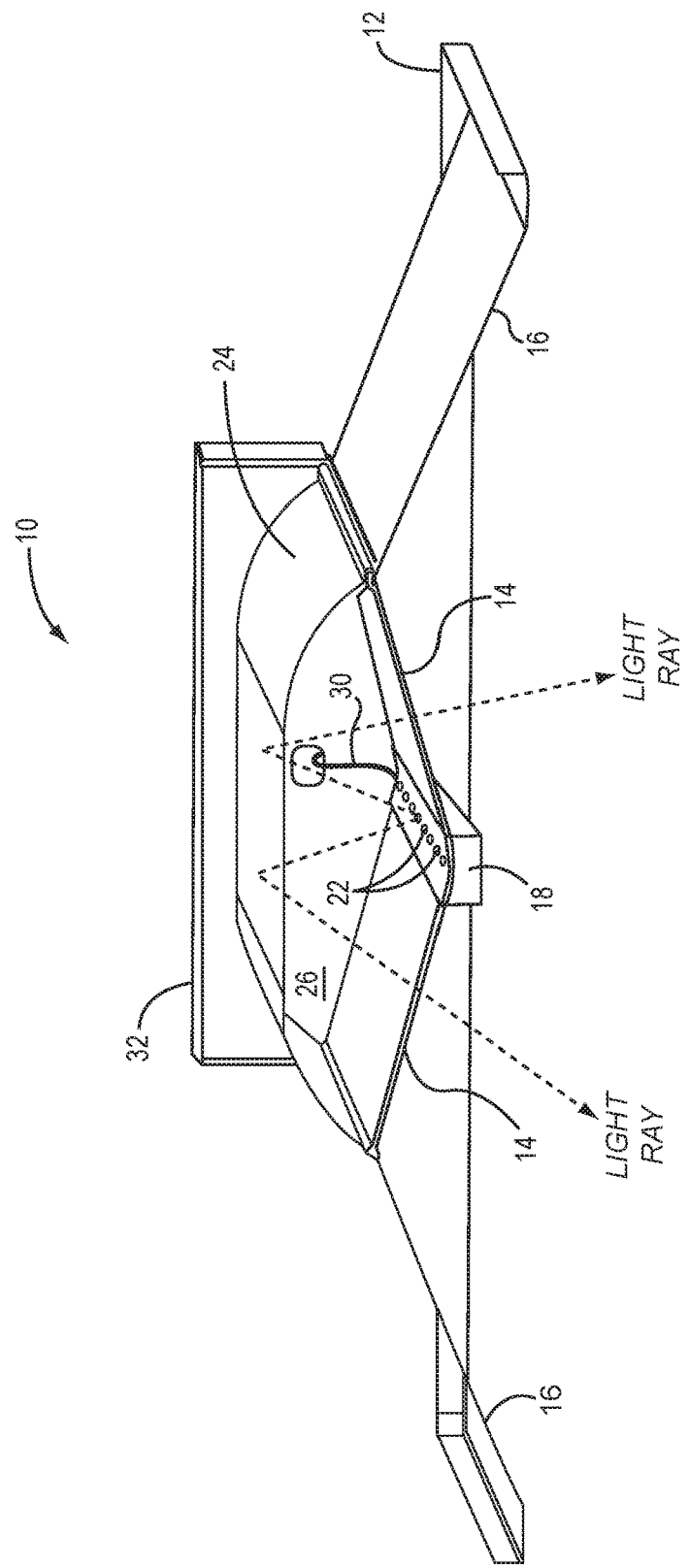
FIG. 3 is a cross-section of the lighting fixture of FIG. 1 illustrating how light emanates from the LEDs of the lighting fixture and is reflected out through lenses of the lighting fixture.

In general, troffer-type lighting fixtures, such as the lighting fixture 10, are designed to mount in, on, or from a ceiling. In most applications, the troffer-type lighting fixtures are mounted into a drop ceiling (not shown) of a commercial, educational, or governmental facility. As illustrated in FIGS. 1-3, the lighting fixture 10 includes a square or rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to a central mounting member 18, which may double as a heatsink and functions in this embodiment to join the two inside edges of the lenses 14. As described in detail further below, an intelligent lighting module (ILM) 20 may be mounted in, on, or to the central mounting member 18 or any other suitable portion of the lighting fixture 10. The ILM 20 provides intelligence for the lighting fixture 10, houses or is otherwise coupled to one or more sensors SX, and facilitates wired and/or wireless communications with other lighting fixtures 10 or other remote entities.

In essence, the ILM 20 is a control and communications module for the lighting fixture 10. The communications with other lighting fixtures 10 and other entities may relate to sharing state information and sensor information, as well as providing instructions or other information that aids in the control of the lighting fixtures 10 or other entities during normal operation or commissioning. While three sensors S1-S3 are illustrated, the lighting fixture may have any number of the same or different sensors SX. The sensors SX may include one or more image, occupancy (i.e. passive infrared (PIR) sensor), acoustic, ambient light, temperature, humidity, pressure, vibration, carbon monoxide, carbon dioxide, air quality, smoke, power, or like sensors Further details are provided below.

Turning now to FIGS. 2 and 3 in particular, the back side of the central mounting member 18 provides a mounting structure for a solid-state light source, such as an LED array 22, which includes one or more rows of individual LEDs mounted on an appropriate substrate. The LEDs are oriented to primarily emit light upwards toward a concave cover 24. The volume bounded by the cover 24, the lenses 14, and the back of the central mounting member 18 provides a mixing chamber 26. As such, light will emanate upwards from the LEDs of the LED array 22 toward the cover 24 and will be reflected downward through the respective lenses 14, as illustrated in FIG. 3. Notably, not all light rays emitted from the LEDs will reflect directly off of the bottom of the cover 24 and back through a particular lens 14 with a single reflection. Many of the light rays will bounce around within the mixing chamber 26 and effectively mix with other light rays, such that a desirably uniform light is emitted through the respective lenses 14.

Those skilled in the art will recognize that the type of lenses 14, the type of LEDs, the shape of the cover 24, and any coating on the bottom side of the cover 24, among many other variables, will affect the quantity and quality of light emitted by the lighting fixture 10. As will be discussed in greater detail below, the LED array 22 may include LEDs of different colors, wherein the light emitted from the various LEDs mixes together to form a white light having a desired characteristic, such as spectral content (color or color temperature), color rendering index (CRI), output level, and the like based on the design parameters for the particular embodiment, environmental conditions, or the like.

If the central mounting member 18 functions as a heatsink, fins (not shown) may extend from the central mounting member 18 in any direction. If the fins extend from the bottom of the central mounting member 18, the fins may be visible from the bottom of the lighting fixture 10. Placing the LEDs of the LED array 22 in thermal contact along the upper side of the central mounting member 18 allows any heat generated by the LEDs to be effectively transferred to the bottom side of the central mounting member 18 for dissipation within the room in which the lighting fixture 10 is mounted.

Figure 4:
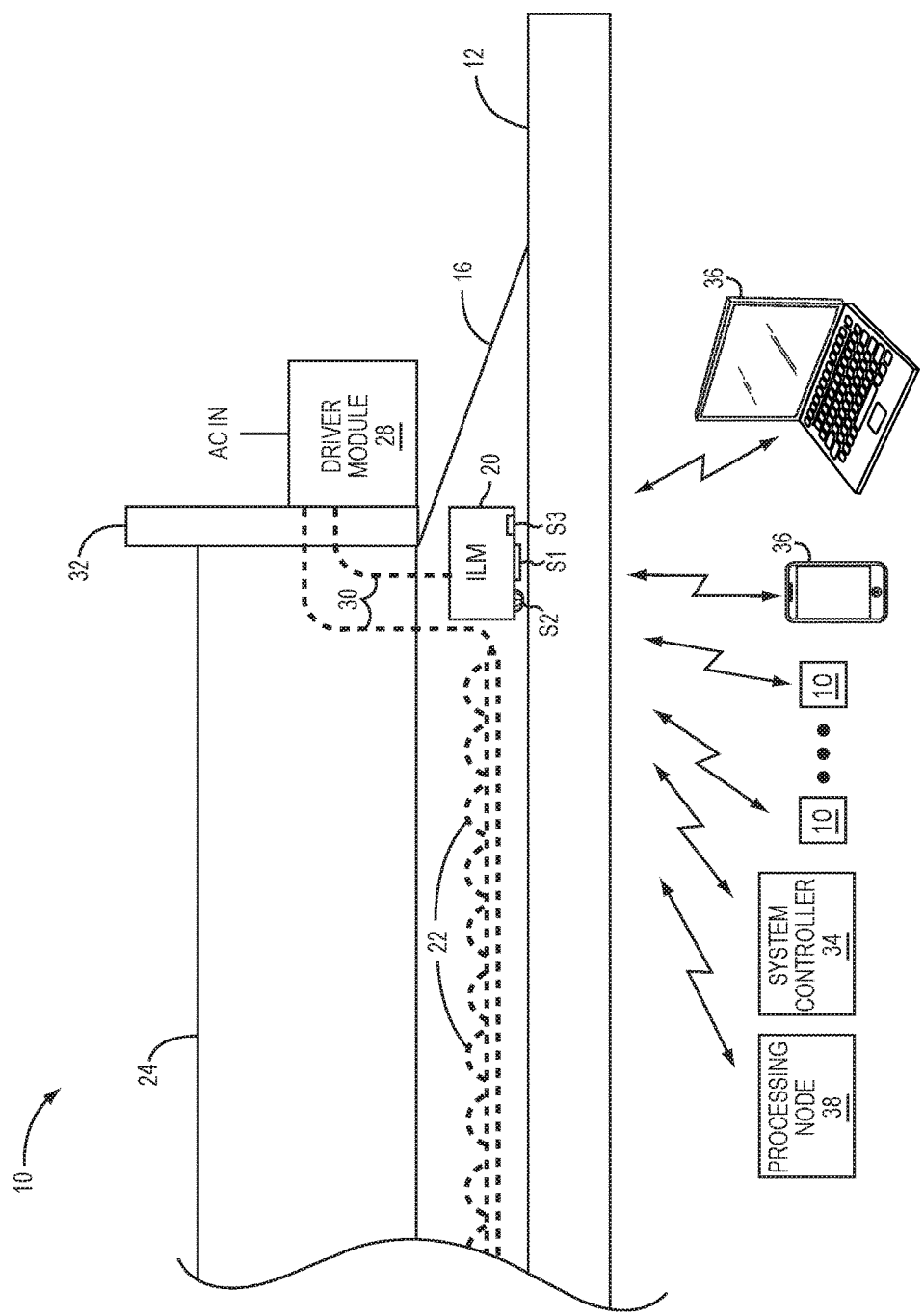
FIG. 4 illustrates a driver module, an LED array, and an intelligent lighting module (ILM) within the lighting fixture of FIG. 1.

As illustrated in FIG. 4, a driver module 28 is coupled to the LED array 22 and the ILM 20 through appropriate cabling 30 and is mounted to a driver mount 32 of the lighting fixture 10. The driver module 28 is used to drive the LED array 22 to provide a desired light output level in response to instructions from the ILM 20. In normal operation, The ILM 20 uses its internal logic to determine an on/off state and an output level for the LED array 22 based on information received directly or indirectly from one or more sensors S1-S3, other lighting fixtures 10, and/or remote entities, such as such as control nodes 36, processing nodes 38, system controllers 34, wall controllers (not shown), and the like. The ILM 20 may also send information bearing on the state of the lighting fixture 10, sensor information, control information, requests for information, and the like to one or more of the other lighting fixtures 10 and/or remote entities. While described as an integrated module, the functionality of the ILM 20 may be incorporated into the driver module 28 or other electronics of the lighting fixture 10.

The system controller 34 represents any type of remote control entity that is configured to control at least one system other than the lighting network in which the lighting fixtures 10 reside. For example, the system controller 34 may be a controller for one or more of a heating, ventilation air conditioning (HVAC) system, a security system, a fire protection system, an irrigation system, a manufacturing system, evacuation systems, occupancy monitoring or control systems, and the like. As discussed in detail below, the concepts provided herein allow the lighting network not only to determine whether various spaces are occupied, but also to determine the number of occupants in a space when the space is occupied. With modern HVAC systems that include variable speed refrigerant flows and fan speeds, HVAC control is no longer simply turning on or the HVAC system. The rate or level of heating, cooling, and/or ventilation is variable. With the concepts provided herein, HVAC control may take into consideration not only room temperature, but also the number of occupants in the room, which is referred to herein as an occupancy level.

The lighting network is able to report the occupancy level for each space such that the HVAC control can dynamically adjust the level of heating, air conditioning, and/or ventilation for each space based on temperature as well as changing occupancy levels. A space with more people may benefit from higher levels of heating, air conditioning, and/or ventilation, and vice versa. In addition to or in lieu of controlling the heating, air conditioning, and/or ventilation levels based on the occupancy level, other HVAC settings may be dynamically controlled or adjusted based on occupancy levels. For example, the HVAC set points, set backs, and/or dead bands (hysteresis ranges about a set point or set back) may be dynamically changed on a room-by-room basis or globally for an entire environment that includes those rooms. As indicated above, HVAC control based on actual occupancy levels as opposed to general occupancy is on one example of control.

The lighting fixtures 10 may be configured to communicate directly with the system controllers 34 or provide the occupancy information to an intermediate device, such as the processing node 38 or control node 36, which will process the occupancy information collected from a group of lighting fixtures 10 and provide appropriate occupancy related instructions or information to the system controllers 34. The processing nodes 38 are generally part of the lighting network and may be used to facilitate configuring the various lighting fixtures 10 in the lighting network during commissioning; group control of the lighting fixtures 10, if such control is not distributed amongst the lighting fixtures 10; communications with remote entities, and the like. The control nodes 36 are dedicated lighting control devices that are used to configure or control the lighting fixtures 10 individually or as a group.

Figure 5:
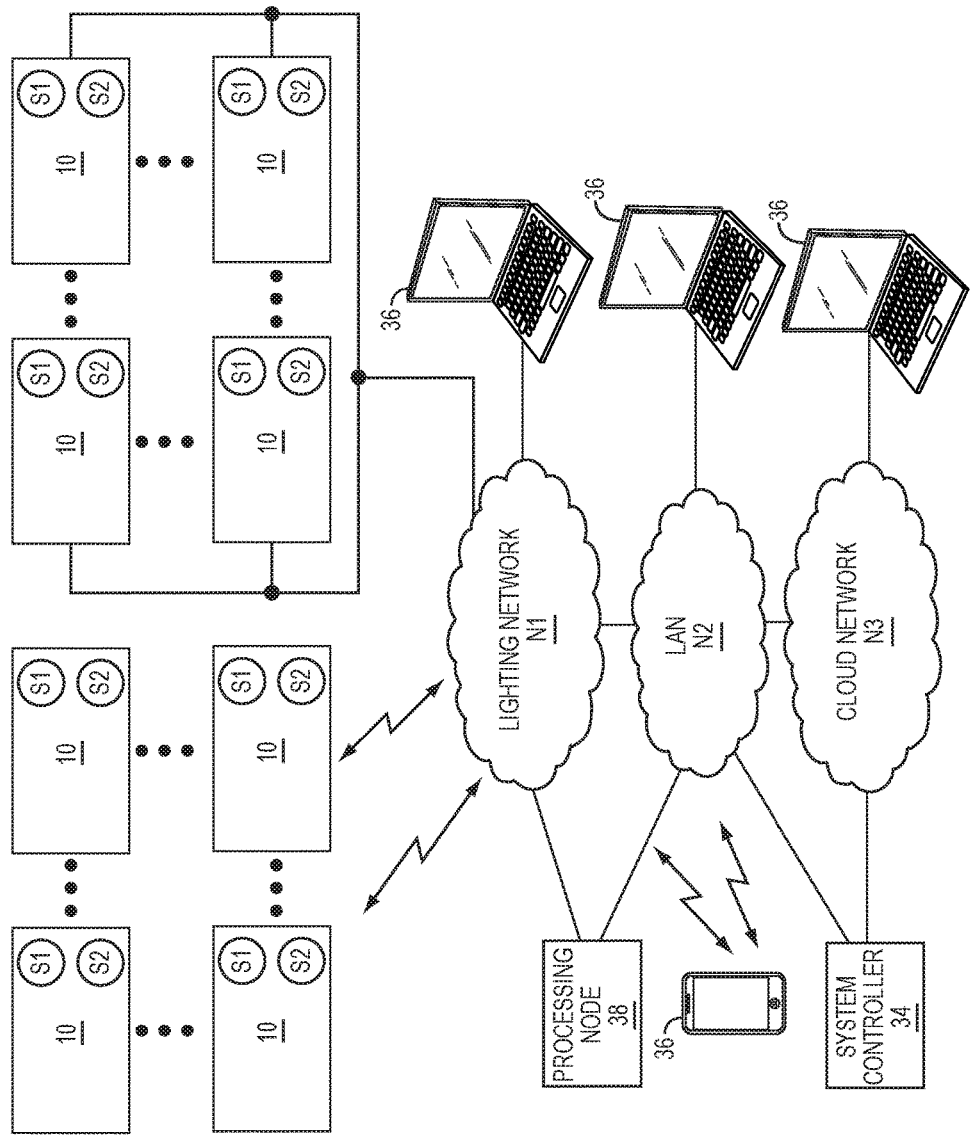
FIG. 5 is a lighting and network environment according one embodiment.

Turning now to FIG. 5, an exemplary lighting network is illustrated. The lighting network includes multiple lighting fixtures 10, each of which includes a first sensor S1, which is an image sensor, and a second sensor S2, which is a PIR-based occupancy sensor. The first and second sensors S1 and S2 may take other forms, as those skilled in art will appreciate. The particular combination of an image sensor for the first sensor S1 and a PIR-based occupancy sensor for the second sensor S2 is for illustrative purposes only.

As illustrated, a first group of the lighting fixtures 10 are configured to communicate with one another as well as other entities using wireless communications and form part of or are coupled to a lighting network N1. A second group of the lighting fixtures 10 are configured to communicate with one another as well as other entities using wired communications, such as Ethernet-based communications, and also form part of or are coupled to the lighting network N1. The lighting network N1 may be coupled to a traditional local area network (LAN) N2, which supports traditional networking within an organization. The LAN N2 is further coupled to a cloud network N3, such as the Internet or like network infrastructure that facilitates communications with remote entities, servers, services, and the like in traditional fashion. Communications with the various system controllers 34, control nodes 36, and processing nodes 38 may be supported by any one of the lighting network N1, LAN N2, and cloud network N3, depending on the location and functionality of the devices. Although not illustrated, the lighting network N1 may include various routers, switches, gateways, standalone sensors, wall controllers for turning on and off as well as dimming all or groups of the lighting fixtures 10, and the like.

Figure 6:
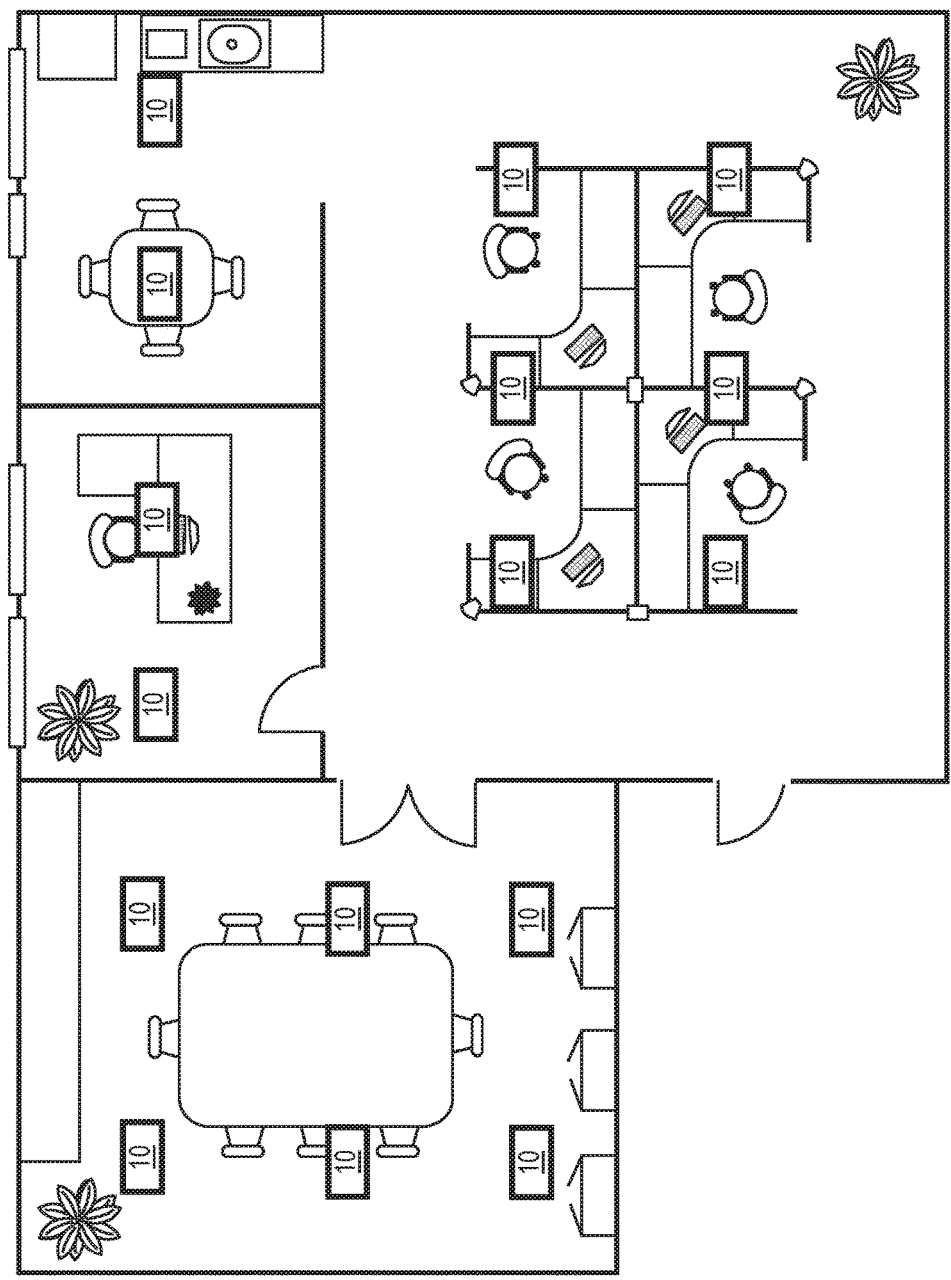
FIG. 6 is a floor plan for an exemplary office environment according to one embodiment.

FIG. 6 illustrates an exemplary office environment with numerous lighting fixtures 10 distributed in the ceiling of the office environment and used for general illumination. In this embodiment, assume that each of the lighting fixtures 10 includes at least one image sensor-based sensor S1 and one PIR-based occupancy sensor S2. In this configuration, the image sensor-based sensor S1 is used as a primary occupancy sensor of high resolution, while the PIR-based occupancy sensor S2 is used as a secondary occupancy sensor of much lower resolution.

As illustrated in FIGS. 7A and 7B, the (image sensor based) first sensor S1 for each lighting fixture 10 has an associated field of view (FOV). The field of view (FOV) corresponds to an area from which the first sensor S1 of the lighting fixture 10 can capture image information. An image is broadly defined herein to include image related information that is captured by the image sensor S1. The image related information includes, but is not limited to, information that corresponds to all or part of a still image, all or part of one or more video frames, characteristics (i.e. color, wavelength, brightness, contrast, size, shape, etc.) of any aspect of all or part of a still image or one or more video frames, or any combination thereof. The fields of view (FOVs) for the first sensors S1 of the respective lighting fixtures 10 may be fixed or variable depending on the design of the first sensors S1 and/or the associated lighting fixtures 10. In either case, the fields of view (FOVs) may either substantially align with one another, such that there is little or no overlap, as provided in FIG. 7A, or substantially overlap with one another, as provided in FIG. 7B. Details are provided further below on how these different configurations affect the tracking of occupants throughout a given environment.

Figure 8:
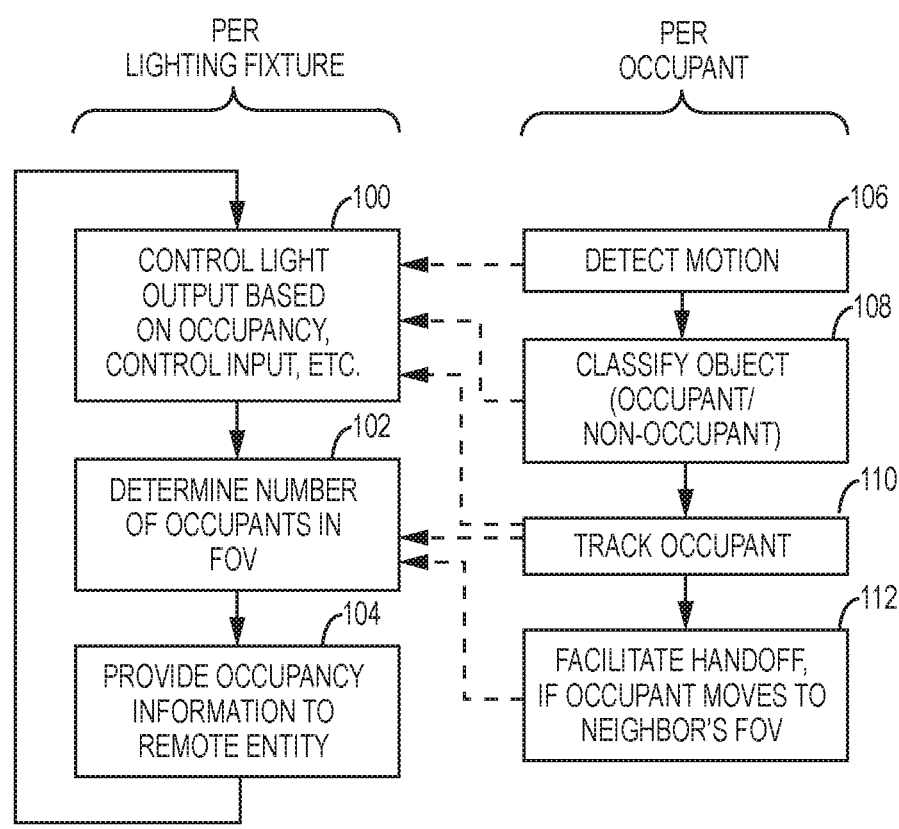
FIG. 8 is a flow diagram illustrating operation of a lighting fixture according to one embodiment.

Turning now to FIG. 8, a flow diagram is provided to illustrate both the general operation of each lighting fixture 10 as well as tracking of occupants within a given environment. Each lighting fixture 10 will control its light output for general illumination based on information or instructions provided by other entities and/or sensors (step 100). For example, light output may be controlled, such as being turned on, turned off, or dimmed to a desired level, based on information received from one or any combination of an associated wall controller, control node 36, system controller 34, processing node 38, other lighting fixture 10, and the like.

In addition to providing light for general illumination, each lighting fixture 10 is configured to determine the number of occupants in the associated field of view (step 102) and provide occupancy information, based on the number of occupants in the associated field of view, to a remote entity, such as the system controller 34, control node 36, processing node 38, and the like (step 104). In essence, the occupancy information for a given lighting fixture 10 generally corresponds to the number of occupants within the lighting fixture's field of view. Based on the occupancy information for the lighting fixtures 10 in a given area, the number of occupants for the given area may be calculated by summing the number of occupants that are in the fields of view for each of the lighting fixtures in the given area. In certain embodiments, steps are taken to avoid redundantly counting an occupant that resides in multiple fields of view at the same time. Details are provided further below.

As indicated above, controlling the light output (step 100), determining the number of occupants in an associated field of view (step 102), and providing occupancy information to a remote entity (step 104), are provided on a fixture-by-fixture basis. Each lighting fixture 10 uses the associated sensors S1, S2, etc. to track occupants on a per occupant basis. As such, one or more occupants may be tracked by a given lighting fixture 10 at any given time. In one embodiment, the lighting fixture 10 will use its sensors S1, S2, etc. to detect motion caused by a moving object in the associated field of view (step 106) and classify the object as either an occupant or non-occupant (step 108). An occupant is considered as a person (human), while a non-occupant is generally considered an object, or anything other than a person. If an object is classified as an occupant, the occupant is tracked while the occupant remains in the associated field of view (step 110).

When the occupant moves or is predicted to move outside of the associated field of view, the lighting fixture 10 will coordinate with neighboring lighting fixtures 10 to facilitate a handoff of the occupant tracking to the neighboring lighting fixture 10 that provides a field of view to which the occupant has moved or is predicted to move (step 112). The detection, classification, tracking, and handoff steps 106-112 may provide information that is helpful when both controlling the light output (step 100) as well as determining the number of occupants in the field of view of a given lighting fixture 10 (step 102). In essence, as occupants are detected in or leave the associated field of view, the lighting fixture 10 will dynamically update and report on the total number of occupants in its associated field accordingly. Again, occupants within the associated field of view of a particular lighting fixture 10 may be tracked on an individual basis, where the lighting fixture 10 may track multiple occupants at any given time.

Figure 9:
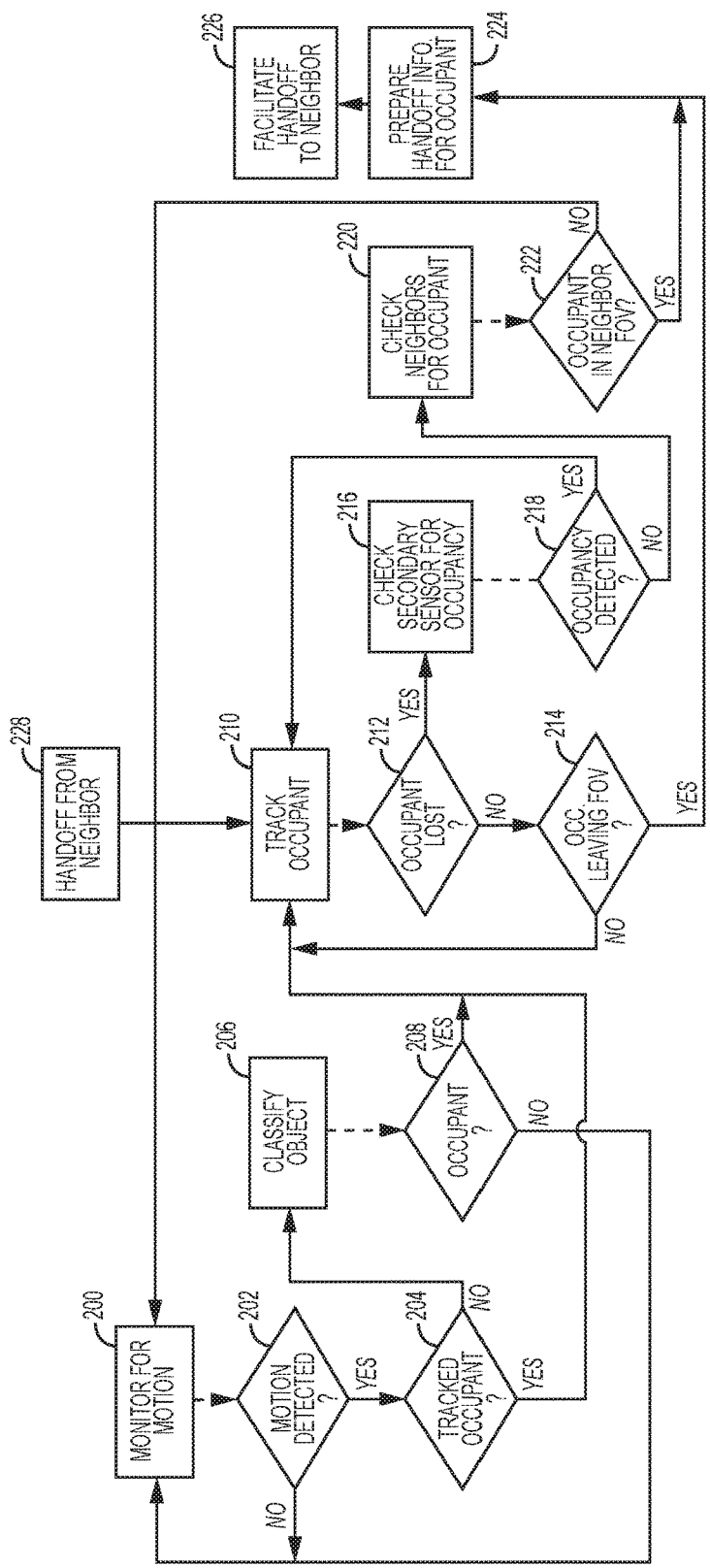
FIG. 9 is a flow diagram illustrating occupant detection, classification, tracking, and handoff for a given a lighting fixture according to one embodiment.

FIG. 9 is a flow diagram illustrating how individual occupants are detected and tracked within a given lighting fixture's field of view using an image sensor based first sensor S1 and PIR-based occupancy sensor S2. The first sensor S1 is used for high-resolution detection, classification and tracking of occupants within a field of view for the associated lighting fixture 10. The second sensor S2 is used for low-resolution occupancy detection. As such, various other types of sensors, such as acoustic, thermal, image, and the like may be employed for sensor S2. It is assumed that control electronics and associated software of the lighting fixture 10 use information gathered from the first and second sensors S1 and S2, and perhaps neighboring lighting fixtures 10, to provide the following functionality. Those skilled in the art will recognize that such functionality may be integrated within or distributed among various hardware and/or software components of one or more lighting fixtures 10 and associated devices.

The process starts when the lighting fixture 10 analyzes information provided by one or both of the first and second sensors S1 and S2 to monitor for motion caused by the movement of an object within the lighting fixture's field of view or general vicinity (step 200). If motion is not detected (step 202), the lighting fixture 10 will continue to monitor for motion (step 200). If motion is detected (step 202), the lighting fixture 10 will analyze information provided by the first sensor S1 in an effort to determine if the object is an occupant who has previously been detected and is currently being tracked (step 204). Motion detection employs the use of one or more sensors S1. As an example for an image-based sensor SX, the lighting fixture 10 will analyze captured image information to detect motion. For a PIR-based occupancy sensor SX, the lighting fixture 10 will receive an output indicative of motion within the sensor's field of view. The lighting fixture 10 may process the information from various sensors SX to detect or otherwise identify motion.

If the object is not an occupant who is currently being tracked, the lighting fixture 10 will analyze the information provided by the first sensor S1 to classify the object as either an occupant or a non-occupant, where an occupant is a person and a non-occupant is an inanimate object (step 206). Those skilled in the art will recognize various schemes to classify an object. Examples include histogram of oriented gradients (HOG) schemes, which use machine learning to classify object appearance and shape. Incorporation of Principal Components Analysis (PCA) into the HOG schemes provide for particularly robust and reproducible classification of occupants and groups of occupants. HOG-based classification is viewed as sufficiently robust, yet not overly computationally burdensome for a lighting application. If even greater accuracy is required, the use of sparse convergent neural networks (SCNN) may be employed; however, the use of SCNN may require more microprocessor memory and/or speed than HOG-based schemes. The SCNN scheme seeks to reduce the complexity of established neural network schemes, thereby reducing response time and computation resources even in visually complex environments. For further information on object classification, reference is made to:

N. Dalai and B. Triggs, "Histograms of Oriented Gradients for Human Detection," IEEE Computer Society Conference on Computer Vision and Pattern Recognition, pp. 886-893 (2005);

Q. Zhu et al., "Fast Human Detection Using a Cascade of Histograms of Oriented Gradients," IEEE Computer Soc. Conf. on Computer Vision and Pattern Recog., 1491-8 (2006);

A. Satpathy et al., "Human Detection by Quadratic Classification on Subspace of Extended Histogram of Gradients," IEEE Trans. on Image Proc., 23, 287-97 (2014);

C. Zeng and H. Ma, "Robust Head-shoulder Detection by PCA-Based Multilevel HOG-LBP Detector for People Counting," Intl. Conf. on Pattern Recognition, 2069-72 (2010); and M. Mathew et al., "Sparse, Quantized, Full Frame CNN for Low Power Embedded Devices," IEEE Conf. on Computer Vision and Pattern Recog., 328-36 (2017), the disclosures of which are incorporated herein in their entireties.

If the object is a non-occupant (step 208), the lighting fixture 10 will continue to monitor for motion (step 200). If the object is an occupant (step 208), the lighting fixture 10 will analyze the information provided by the first sensor S1 to track the occupant within the field of view associated with the first sensor S1 (step 210). The function of tracking may range from simply determining that the occupant is within the field of view to determining one or more of a precise location within the field of view, a direction of travel, and a velocity of travel, wherein the direction and velocity of travel may be represented with an appropriate vector that is associated with a direction and magnitude, which corresponds to velocity.

The lighting fixture 10 may also analyze the information received from the first sensor S1 to identify one or more physical characteristics associated with the occupant, such as shape, size, colors, patterns, and the like. These characteristics are helpful for re-identifying an occupant when tracking is lost within the lighting fixture's field of view, recognizing that the occupant is a single occupant when the occupant resides in an area where the fields of view from adjacent lighting fixtures 10 overlap, and handing off tracking of an occupant from one lighting fixture 10 to another when the occupant moves from one lighting fixture's field of view and to another.

The tracking function may employ various tracking schemes, including Kalman filtering, which provides a streamlined and effective technique for persistently tracking objects. Further information on Kalman filtering is proved in the following references:

R. Kalman, "A New Approach to Linear Filtering and Prediction Problems," Trans. of the ASME—Journal of Basic Engineering, 82 (Series D): 35-45 (1960), and J. Berclaz et al., "Robust People Tracking with Global Trajectory Optimization," IEEE Computer Society Conf. on Computer Vision and Pattern Recog., 744-750 (2006), the disclosures of which are incorporated herein by reference in their entirety.

When motion is detected and the object detected is a previously tracked occupant (step 204), the lighting fixture 10 may skip the steps of classifying the object (steps 206 and 208), since the object is already known as an occupant, and move directly to tracking the occupant (step 210). As indicated above, this situation may occur when an occupant has not left the field of view for the lighting fixture 10, but tracking is lost for some reason. As the occupant moves within the field of view, the lighting fixture 10 will detect motion associated with the occupant moving (step 202), analyze information provided by sensor S1, and recognize that the object is a previously tracked occupant based on the analysis of the information provided by the sensor S1 (step 204).

While tracking an occupant, the lighting fixture 10 may be configured to detect when tracking is lost for the occupant (step 212) as well as detect or predict that the occupant is leaving the field of view (step 214) for the lighting fixture 10. Assuming tracking for the occupant is not lost (step 212) in that the occupant has not left or is not leaving the field of view for the lighting fixture 10, tracking will continue (step 210). If tracking for the occupant is lost (step 212), the lighting fixture 10 may be configured to check information from the second sensor S2, which in this embodiment is PIR-based occupancy sensor, and determine whether or not occupancy is being detected via the second sensor S2 (step 216). If the information from the second sensor S2 indicates that occupancy is still being detected (step 218), the lighting fixture 10 will continue trying to track the occupant (step 210).

If the information from the second sensor S2 indicates that occupancy is not detected (step 218), the lighting fixture 10 will communicate with adjacent lighting fixtures 10 that provide neighboring fields of view to that provided by the lighting fixture 10 (step 220). The interaction between neighboring lighting fixtures may take many forms. For example, the lighting fixture 10 may ask its neighbors if any occupants have recently appeared in their fields of view from the field of view of the lighting fixture 10. The lighting fixture 10 may also provide its neighbors with recent information bearing on one or more of recent location, direction, velocity, and physical characteristics of the lost occupant and the neighbors will compare the information provided by the lighting fixture 10 with any occupants currently being tracked by the neighbors.

If a determination is made that the lost occupant is not in the neighbor's field of view (step 222), the lighting fixture 10 reverts back to monitoring for motion (step 200). At this point, the lighting fixture 10 is able to recognize the lost occupant if the occupant is once again detected in the lighting fixture's field of view. Notably, the lighting fixture 10 is always monitoring the field of view for new objects that could be occupants when the process repeats.

If a determination is made that the lost occupant is in the neighbor's field of view (step 222), the lighting fixture 10 will provide any handoff information necessary for handing off tracking of the lost occupant to the neighbor that has picked up the occupant in its field of view (step 224) and then facilitate handoff of the occupant to the neighbor (step 226). The handoff information may include a combination of location, direction, velocity, and physical characteristics of the lost occupant. This list is not inclusive, and those skilled in the art will recognize other pertinent information that may be helpful in various embodiments. Kalman filtering or the like may be used to facilitate handoffs.

Returning to step 214, another trigger for handing off tracking of an occupant to the neighbor is when the lighting fixture 10 is actively tracking the occupant (step 210) and predicts, or determines, that the occupant is leaving the lighting fixture's field of view (step 214). If the lighting fixture 10 can identify the neighbor toward which the occupant is moving, the lighting fixture 10 will prepare the handoff information for the occupant (step 224) and communicate with the neighbor to share the handoff information and facilitate the handoff (step 226). If the lighting fixture 10 cannot identify the neighbor toward which the occupant is moving, the lighting fixture 10 will prepare the handoff information for the occupant and communicate with other lighting fixtures 10 in the lighting network N1 to look for an occupant entering their fields of view. A neighbor receiving the occupant may acknowledge receipt of the occupant and increase its occupancy count to account for the new occupant in its field of view. The lighting fixture 10 we will reduce its occupancy count to account for having an occupant leave its field of view.

Step 228 indicates that a handoff of an occupant from a neighbor may enter the process at the tracking phase (step 210); however, other embodiments may bring in an occupant that is being handed off from a neighbor at any other point in the process.

FIGS. 10A through 10F illustrate imagery of a single field of view (FOV) derived from a sensor S1 at six points in time (t1-t6). In this example, two occupants, person P1 and person P2, as well as one non-occupant object N, are present at one time or another in the field of view (FOV). Throughout the progression, person P1 enters the field of view from the left, progresses from left to right through the field of view, and exits the field of view on the right. Using information collected from the sensor S1, the lighting fixture 10 employs a first process to detect and determine that the person P1 is an occupant for occupancy purposes as well as track person P1 as she enters, progresses through, and exits the field of view.

Figure 10A:
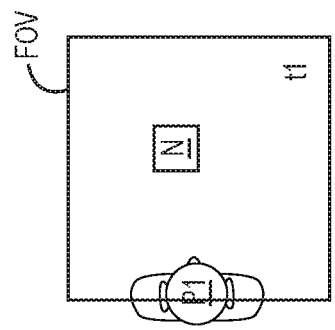
FIGS. 10A through 10F illustrate movement of occupants through an exemplary field of view.
Figure 10B:
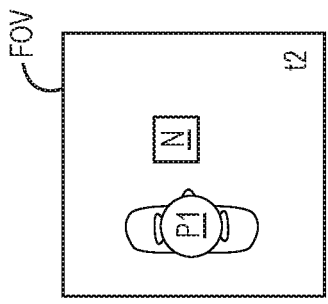
Figure 10C:
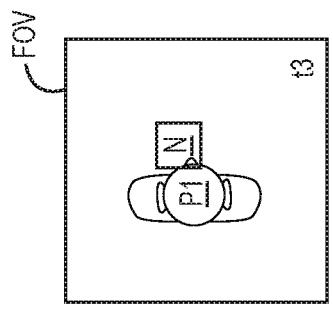
Figure 10D:
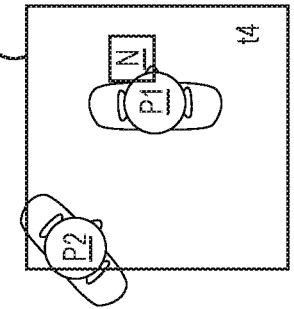
Figure 10E:
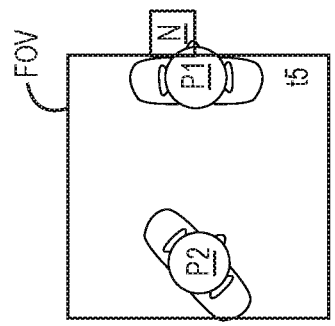
Figure 10F:
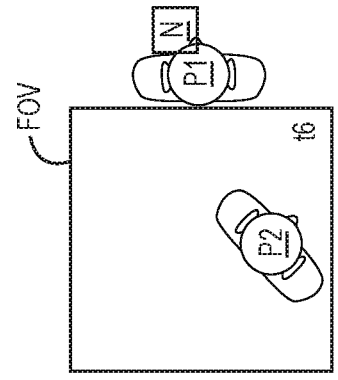

Using the same information collected from the sensor S1, the lighting fixture 10 employs a second process to detect the movement of the non-occupant object N, once the non-occupant object N begins moving at time t3 (FIG. 10C). Based on the collected information, the lighting fixture 10 will be able to determine that the non-occupant object N is not an occupant for occupancy purposes. Using information collected from the sensor S1, the lighting fixture 10 employs a third process to detect and determine that the person P2 is an occupant for occupancy purposes as well as track person P2 as he enters and diagonally progresses through the field of view.

The lighting fixture 10 will update its occupancy count accordingly as persons P1 and P2 enter and leave the field of view (FOV). The presence or movement of the non-occupant object N will not affect the occupancy count. The lighting fixture 10 will report the occupancy information periodically or as it changes to a remote entity, such as a system controller 34, control node 36, processing node 38, or the like, which may take appropriate action based on the occupancy information or a change in the occupancy information.

When there are overlapping fields of view provided by the various lighting fixtures 10, logic trees may be developed to recognize and act on movement of occupants through the borders (periphery) of the various fields of view with neighboring lighting fixtures 10 being notified of imminent occupant arrival based on their position relative to the reporting lighting fixture 10. In one embodiment, handoff logic is developed to effectively handle the case where an occupant resides in an overlapping portion of two fields of view by incorporating probabilistic weighting to define which lighting fixture 10 "owns," and thus should account for, the occupant.

Figure 11B:
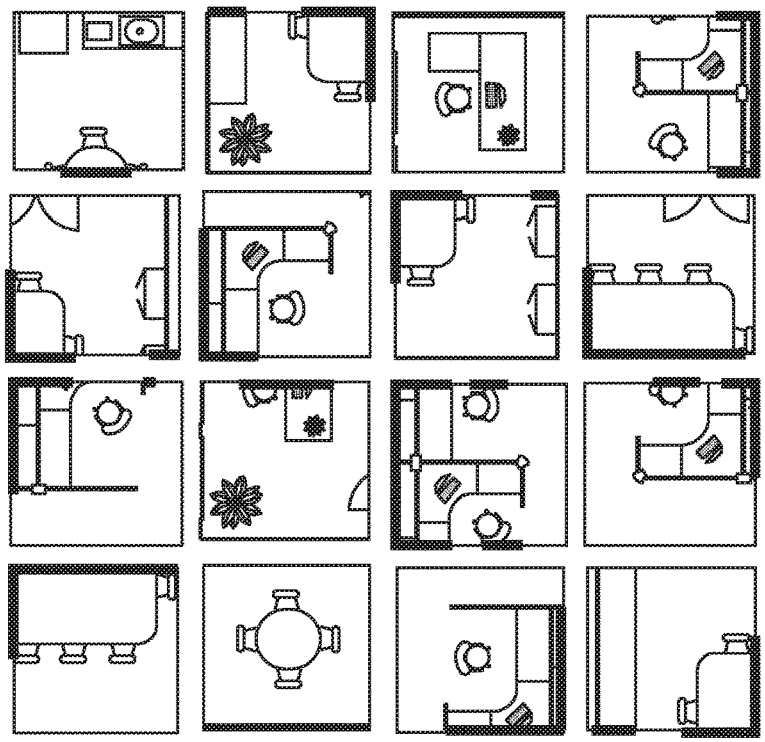
FIG. 11B illustrates fields of view after a mapping operation.
Figure 11A:
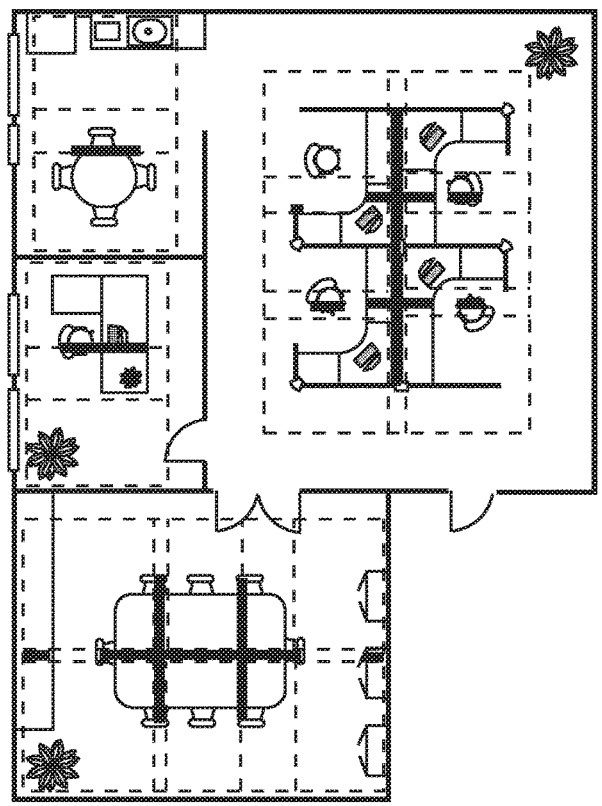
FIG. 11A illustrates fields of view prior to a mapping operation.

When determining overall occupancy for a particular space, identifying the lighting fixtures 10 that are within the space as well as the relative location of the lighting fixtures 10 in space is very helpful in maintaining accurate occupancy accounts for the space. FIG. 11A illustrates an office environment that has a conference room, two offices, and a cubicle area having four cubicles. Each dashed square represents the field of view of an overhead lighting fixture 10. As illustrated, many of the fields of view of the lighting fixtures can overlap with one another, such as that previously discussed in association with FIG. 7B.

As graphically presented in FIG. 11A, the rooms in which the lighting fixtures 10 are located as well as the relationships, or relative locations, of lighting fixtures 10 within the office environment are clearly depicted. However, when the lighting fixtures 10 are installed, neither the lighting fixtures 10 nor any remote entities that may control or receive information from them are able to discern location or relationship information without automated or manual mapping of some form. FIG. 11B graphically represents the fact that when initially installed, lighting fixtures 10 are essentially randomly located and oriented. During a commissioning process, a user may employ a remote entity, such as a control node 36, to access the fields of view for the various lighting fixtures 10 and map them according to their orientation and location throughout the office environment. The user may also assign the lighting fixtures 10 to occupancy groups, based on the particular space in which the lighting fixtures 10 reside. For example, the conference room occupancy group will have six lighting fixtures 10, the occupancy group for each of the offices will include two lighting fixtures 10, and the occupancy group for the cubicle area will include six lighting fixtures 10.

Depending on the capabilities of the system, the user may be able to precisely map and orient lighting fixtures 10, such that each lighting fixture 10 may be provided with sufficient information to identify the other lighting fixtures 10 that are within the particular occupancy group of the lighting fixture 10, those neighboring lighting fixtures 10 that are immediately adjacent the lighting fixture 10, the role of the position of the neighboring lighting fixtures 10 relative to the lighting fixture 10, and the like. As such, each lighting fixture 10 may be provided with information identifying the occupancy group within which it resides, the neighboring lighting fixtures 10 that are immediately adjacent other lighting fixtures 10, and a relative location of the neighboring lighting fixtures 10. This information is particularly helpful for the tracking and handoff functions, which were described above.

The mapping process may be automated to varying degrees. In a highly automated embodiment, the processing node 38 or the like will collect image information from the various lighting fixtures 10, analyze the content and/or characteristics of the image information, and create a map of the lighting fixtures 10 as described above and graphically represented in FIG. 11A. During such a process, the image analysis may identify objects, patterns, colors, light intensities, lighting gradients, and the like in an effort to piece the fields of view into a cohesive map. In this particular example, portions of the perimeter of the fields of view that are likely to include helpful alignment cues, such as walls, bisected objects, and the like, and are highlighted in bold. These portions of the perimeter the fields of view include walls, objects that span fields of view, and the like.

The mapping process may be supplemented or replaced by other location determining techniques. For example, a lightcasting technique may be employed, where the various lighting fixtures 10 take turns providing a pulsed light output while the other lighting fixtures 10 use appropriate sensors to look for pulsed light. Those lighting fixtures 10 that are able to detect each other's pulsed light output are assigned to a particular group. For additional information regarding lightcasting and grouping of lighting fixtures, reference is made to U.S. Pat. Nos. 8,975,827 and 9,706,617, which are incorporated by reference in their entireties. Lighting fixtures 10 may also employ triangulation or distance determining techniques using radio frequency, acoustic, light, or like signals to provide or aid the mapping process. Reference is made to U.S. Pat. No. 9,769,900; Ser. No. 15/192,035, filed Jun. 24, 2016; Ser. No. 15/191,753, filed Jun. 24, 2016; and U.S. Pat. No. 9,888,546, which disclose various grouping and mapping techniques and are incorporated herein by reference in their entireties.

Figure 12:
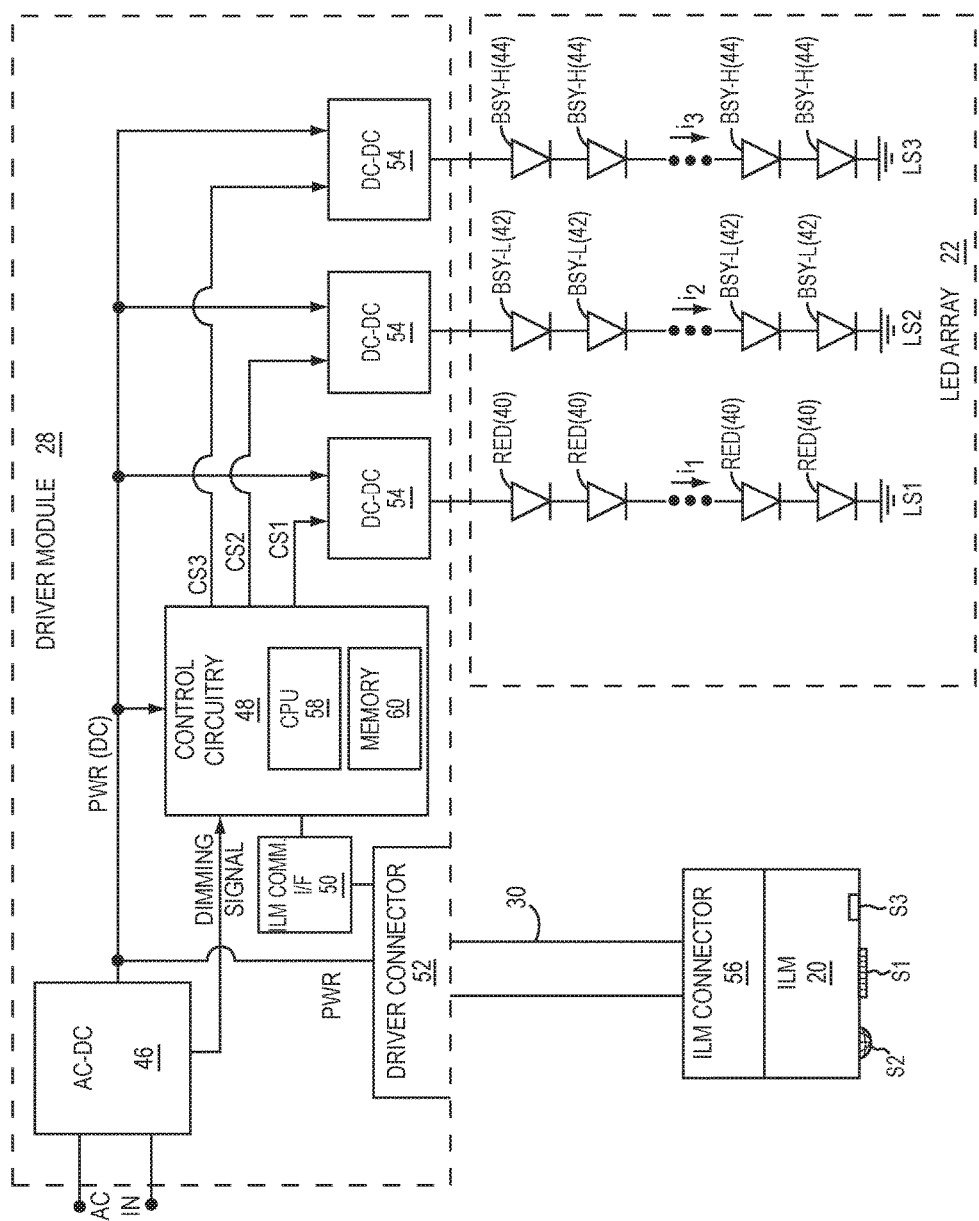
FIG. 12 illustrates a driver module provided in an electronics housing and a communications module in an associated housing coupled to the exterior of the electronics housing.

FIG. 12 provides an exemplary schematic of the driver module 28, the LED array 22, and the ILM 20. In the illustrated embodiment, the LED array 22 may include a mixture of LEDs of different colors. While those skilled in the art will recognize various color combinations, the following example employs red LEDs 40 that emit reddish light at a first wavelength, blue shifted yellow (BSY) LEDs 42 that emit yellowish/greenish light at a second wavelength, and BSY LEDs 44 that emit yellowish/greenish light at a third wavelength, which is different than the second wavelength. The LED array 22 may be divided into multiple strings of series connected LEDs. In essence, LED string LS1, which includes a number of red LEDs 40, forms a first group of LEDs. LED string LS2, which includes BSY LEDs 42, forms a second group of LEDs. LED string LS3, which includes BSY LEDs 44, forms a third group of LEDs.

In general, the driver module 28 controls the drive currents $i_1$, $i_2$, and $i_3$, which are used to drive the respective LED strings LS1, LS2, and LS3. The ratio of drive currents $i_1$, $i_2$, and $i_3$ that are provided through respective LED strings LS1, LS2, and LS3 may be adjusted to effectively control the relative intensities of the reddish light emitted from the red LEDs 40 of LED string LS1, the yellowish/greenish light emitted from the BSY LEDs 42 of LED string LS2, and the yellowish/greenish light emitted from the BSY LEDs 44 of LED string LS3. The resultant light from each LED string LS1, LS2, and LS3 mixes to generate an overall light output that has a desired color, correlated color temperature (CCT), and intensity, the latter of which may also be referred to a dimming level. As noted, the overall light output may be white light that falls on or within a desired proximity of the Black Body Locus (BBL) and has a desired CCT.

The number of LED strings LSx may vary from one to many, and different combinations of LED colors may be used in the different strings. Each LED string LSx may have LEDs of the same color, variations of the same color, or substantially different colors. In the illustrated embodiment, each LED string LS1, LS2, and LS3 is configured such that all of the LEDs 40, 42, 44 that are in the string are all essentially identical in color. However, the LEDs 40, 42, 44 in each string may vary substantially in color or may be completely different colors in certain embodiments. In another embodiment, three LED strings LSx with red, green, and blue LEDs may be used, wherein each LED string LSx is dedicated to a single color. In yet another embodiment, at least two LED strings LSx may be used, wherein the same or different colored BSY or blue shifted green (BSG) LEDs are used in one of the LED strings LSx and red LEDs are used in the other of the LED strings LSx. A single string embodiment is also envisioned, where currents may be individually adjusted for the LEDs of the different colors using bypass circuits, or the like.

The driver module 28 depicted in FIG. 12 includes AC-DC conversion circuitry 46, control circuitry 48, an ILM communication interface (I/F) 50, a driver connector 52, and a number of current sources, such as the illustrated DC-DC converters 54. The AC-DC conversion circuitry 46 is configured to receive an AC power signal (AC IN), rectify the AC power signal, correct the power factor of the AC power signal, and provide a DC power signal (PWR). The DC power signal may be used to directly or indirectly power the control circuitry 48 and any other circuitry provided in the driver module 28, including the DC-DC converters 54 and the ILM communication interface (I/F) 50. The DC power signal may also be provided to the driver connector 52 to power the ILM 20. Cabling 30 may extend from the driver connector 52 to an ILM connector 56, which may be mounted to or in the central mounting member 18 (FIGS. 1-4) or other portion of the lighting fixture 10. In one embodiment, the ILM connector 56 is configured to releasably engage the ILM 20. When the cabling 30 is connected and the ILM 20 is engaged with the ILM connector 56, the ILM 20 can receive the DC power signal as well as communicate bidirectionally with the control circuitry 48 of the driver module 28 via the ILM communication interface 50 using proprietary or standard communication protocols.

To control the light output of the LED array 22, the ILM 20 will determine a desired light output level based on one or more of the factors described above and send an instruction to the driver module 28. The driver module 28 will receive the instruction, determine the desired light output level from the instruction, and drive the LED array 22 in a manner to provide the light output level. The driver module 28 may acknowledge receipt of the instruction and/or provide sufficient feedback to the ILM 20 that the LED array 22 is being driven according to the instruction. From an off state, the ILM 20 may instruct the driver module 28 to turn on and drive the LED array 22 to provide a particular light output level in response to determining that the lighting fixture 10 should turn on. From an on state, the ILM 20 may instruct the driver module 28 to stop driving the LED array 22 in response to determining that the lighting fixture 10 should turn off.

In response to an instruction by the ILM 20 to output light at a particular light output level, the three respective DC-DC converters 54 of the driver module 28 provide drive currents $i_1$, $i_2$, and $i_3$ for the three LED strings LS1, LS2, and LS3 in response to control signals CS1, CS2, and CS3. The control signals CS1, CS2, and CS3 may be pulse width modulated (PWM) signals that effectively turn the respective DC-DC converters 54 on during a logic high state and off during a logic low state of each period of the PWM signal. As a result, the drive currents $i_1$, $i_2$, and $i_3$ for the three LED strings LS1, LS2, and LS3 may also be PWM signals. The intensity of light emitted from each of the three LED strings LS1, LS2, and LS3 will vary based on the duty cycle of the respective PWM signals. The control circuitry 48 will adjust the duty cycle of the drive currents $i_1$, $i_2$, and $i_3$ provided to each of the LED strings LS1, LS2, and LS3 to effectively adjust the intensity of the resultant light emitted from the LED strings LS1, LS2, and LS3 while maintaining the desired CCT based on instructions from the ILM 20.

In an alternative embodiment, the drive currents $i_1$, $i_2$, and $i_3$ for the three LED strings LS1, LS2, and LS3 may be variable DC currents instead of PWM signals. In certain instances, a dimming device, such as a wall controller, may control the AC power signal and provide a separate a 0-10 volt DC signal or the like to the driver module 28. The AC-DC conversion circuitry 46 or other electronics may be configured to detect the relative amount of dimming associated with the AC power signal or 0-10 volt DC signal and provide a corresponding dimming signal (DIMMING SIGNAL) to the control circuitry 48 of the driver module 28. The control circuitry 48 may pass information based on the dimming signal to the ILM 20 via the ILM communication interface 50. The ILM 20 can take the dimming information into consideration when providing instructions to the driver module 28.

The control circuitry 48 may include a central processing unit (CPU) 58 and sufficient memory 60 to enable the control circuitry 48 to bidirectionally communicate with the ILM 20 through the ILM communication interface 50 using a defined protocol, such as the Digital Addressable Lighting Interface (DALI) or DALI2. The control circuitry 48 may receive data or instructions from the ILM 20 and take appropriate action to process the data and implement the received instructions. The instructions may range from controlling how the LED array 22 is driven to returning operational data of the driver module 28 to the ILM 20.

Notably, when the term "control system" is used in the claims or generically in the specification, the term should be construed broadly to include the hardware and any additional software or firmware that is needed to provide the stated functionality. The term "control system" should not be construed as only software, as electronics are needed to implement control systems described herein. For example, a control system may, but does not necessarily, include the control circuitry 48, the DC-DC converters 54, the AC-DC conversion circuitry 46, and the like.

Figure 13:
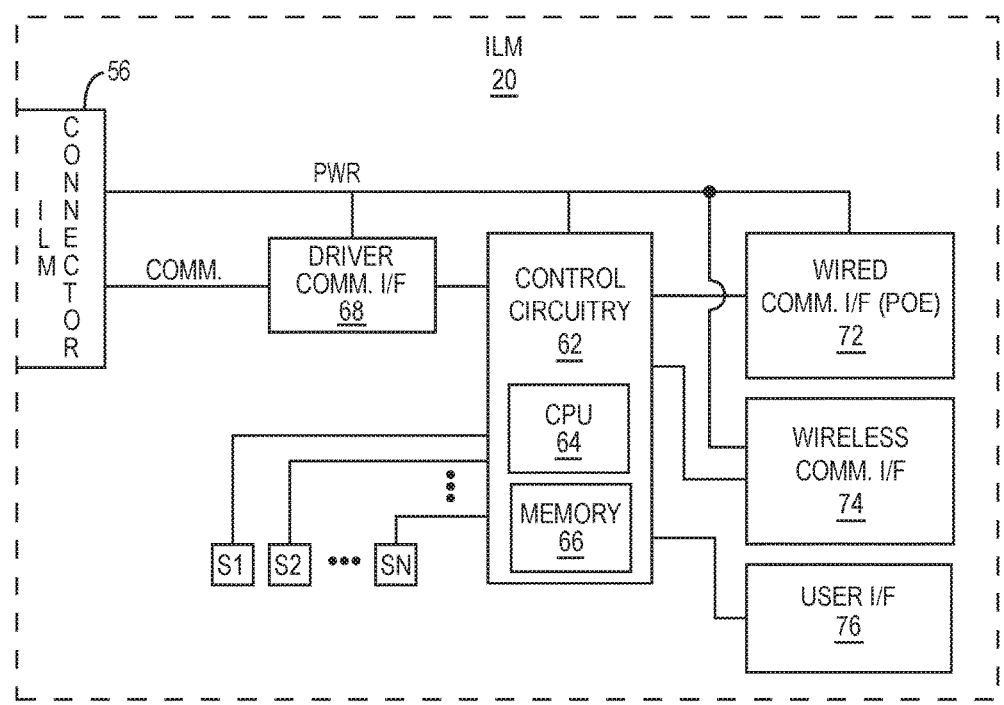
FIG. 13 is a block diagram of an ILM according to one embodiment of the disclosure.

With reference to FIG. 13, a block diagram of one embodiment of the ILM 20 is illustrated. The ILM 20 includes control circuitry 62 having an associated CPU 64 and memory 66, which contains the requisite software instructions and data to facilitate operation as described herein. The control circuitry 62 may be associated with a driver communication interface 68, which is to be coupled to the driver module 28, directly or indirectly via the ILM connector 56. The control circuitry 62 may be associated with a wired communication interface 72, a wireless communication interface 74, or both, to facilitate wired or wireless communications with other lighting fixtures 10, and/or remote entities, such as wall controllers, mobile terminals, personal computers, and the like. The wireless communication interface 74 may include the requisite transceiver electronics to facilitate wireless communications with remote entities using any number of wireless communication protocols. The wired communication interface 72 may support universal serial bus (USB), Ethernet, or like interfaces using any number of wired communication protocols.

In one embodiment, the ILM 20 may receive power in the form of a DC signal from the driver module 28 via the ILM connector 56 and facilitate communications with the driver module 28 via the driver communication interface 68 and the ILM connector 56. Communications with other lighting fixtures 10 and/or remote entities, such as wall controllers, mobile terminals, personal computers, and the like, are facilitated via the wired or wireless communication interfaces 72, 74.

In an alternative embodiment, the ILM 20 will receive power in the form of a DC power signal via the wired communication interface 72, which may be configured as a power over Ethernet (PoE) interface. The DC power signal received via the wired communication interface 72 is used to power the electronics of the ILM 20 and is passed to the driver module 28 via the ILM connector 56. The driver module 28 will use the DC power signal to power the electronics of the driver module 28 and drive the LED array 22. Communications with other lighting fixtures 10 and/or remote entities, such as wall controllers, mobile terminals, personal computers, and the like, are facilitated via the wired communication interface 72. The ILM 20 will facilitate communications with the driver module 28 via the driver communication interface 68 and the ILM connector 56.

As noted, the ILM 20 includes multiple integrated sensors S1-SN, which are directly or indirectly coupled to the control circuitry 62. The sensors S1-SN may include one or more image, occupancy, ambient light, acoustic, temperature, humidity, pressure, vibration, carbon monoxide, carbon dioxide, air quality, smoke, power, or like sensors. The sensors S1-SN provide sensor data to the control circuitry 62. Based on internal logic, the ILM 20 will determine how the driver module 28 should drive the LED array 22 based on the sensor data and any other data or instructions received from remote entities, such as other lighting fixtures 10, wall controllers, mobile terminals, personal computers, and the like. Based on how the driver module 28 should drive the LED array 22, the ILM 20 will generate and send appropriate instructions to the driver module 28 via the driver communication interface 68 and the ILM connector 56. The driver module 28 will drive the LED array 22 based on the instructions received from the ILM 20. These instructions may result in the driver module 28 turning off the LED array 22, turning on the LED array 22 to a certain light output level, changing the light output level provided by the LED array 22, changing the color or CCT of the light output, and the like.

In addition to controlling the driver module 28 to control the light output of the LED array 22, the ILM 20 plays an important role in coordinating intelligence and sharing data among the lighting fixtures 10 and with other remote entities, such as the system controllers 34, control nodes 36, and processing nodes 38. In addition to receiving data and instructions from other lighting fixtures 10 or remote control entities and using such information to control the driver module 28, the ILM 20 may also provide instructions to other lighting fixtures 10 and remote control entities based on the sensor data from its integrated sensors S1-SN as well as the sensor data and instructions received from the other lighting fixtures 10 and remote control entities.

The ILM 20 may have a user interface 76 that provides information related to the state or operation of the ILM 20, allows a user to manually provide information to the ILM 20, or a combination thereof. As such, the user interface 76 may include an input mechanism, an output mechanism, or both. The input mechanism may include one or more of buttons, keys, keypads, touchscreens, microphones, or the like. The output mechanism may include one more LEDs, a display, or the like. For the purposes of this application, a button is defined to include a push button switch, all or part of a toggle switch, rotary dial, slider, or any other mechanical input mechanism.

Figure 14:
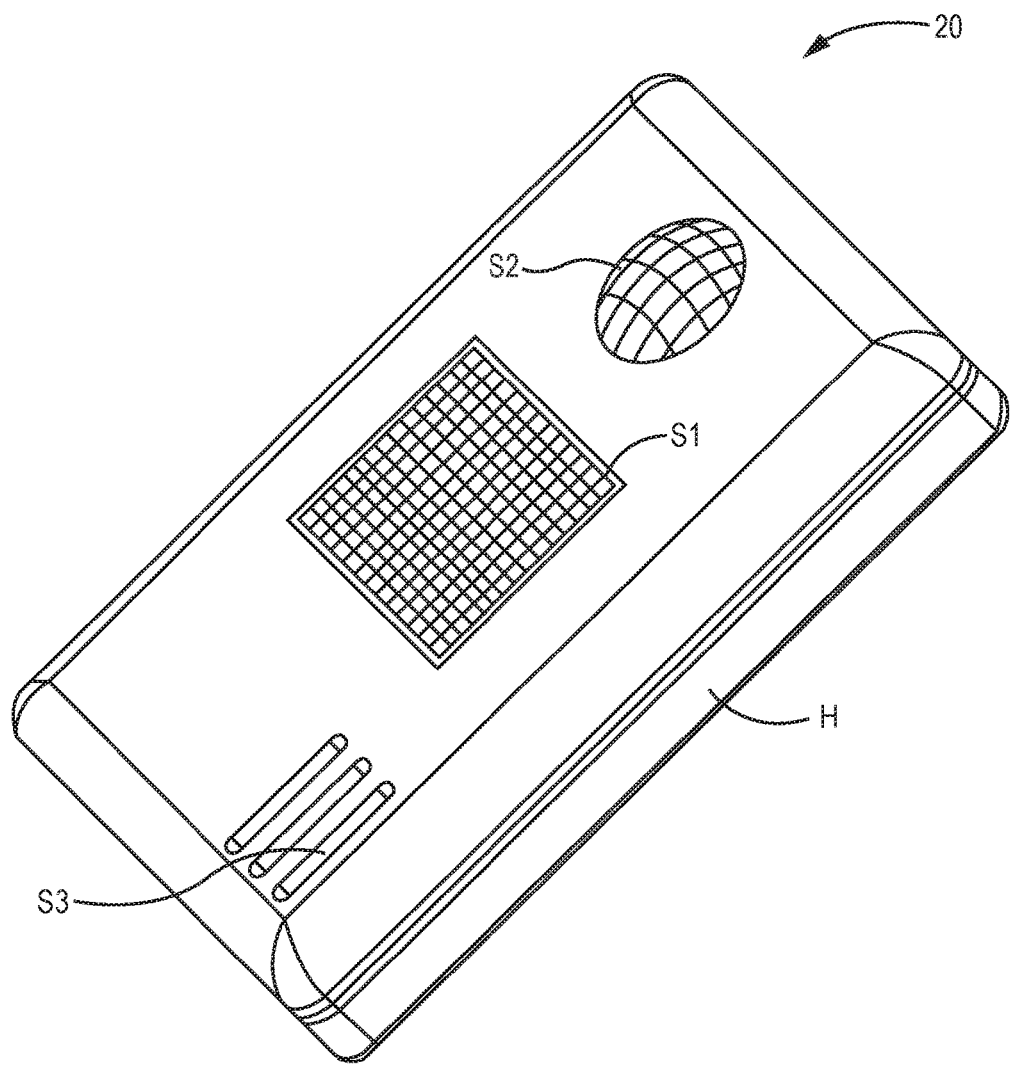
FIG. 14 is a top isometric view of an ILM according to a first embodiment of the disclosure.

An exemplary ILM 20 is illustrated in FIG. 14. The ILM 20 has a housing H in or on which sensors S1, S2, and S3 and the electronics described above are mounted. In this particular but non-limiting embodiment, sensor S1 is an image sensor, sensor S2 is an PIR-based occupancy sensor, and sensor S3 is an acoustic sensor mounted behind three openings that are provided in the housing H. In this example, the housing H of the ILM 20 is configured to releasably engage a compatible cradle (not shown) or the like provided by the lighting fixture 10 in a snap-fit manner, such that the sensors S1-S3 are exposed to the lighting environment when the ILM 20 is mounted to the lighting fixture 10.

Figure 15:
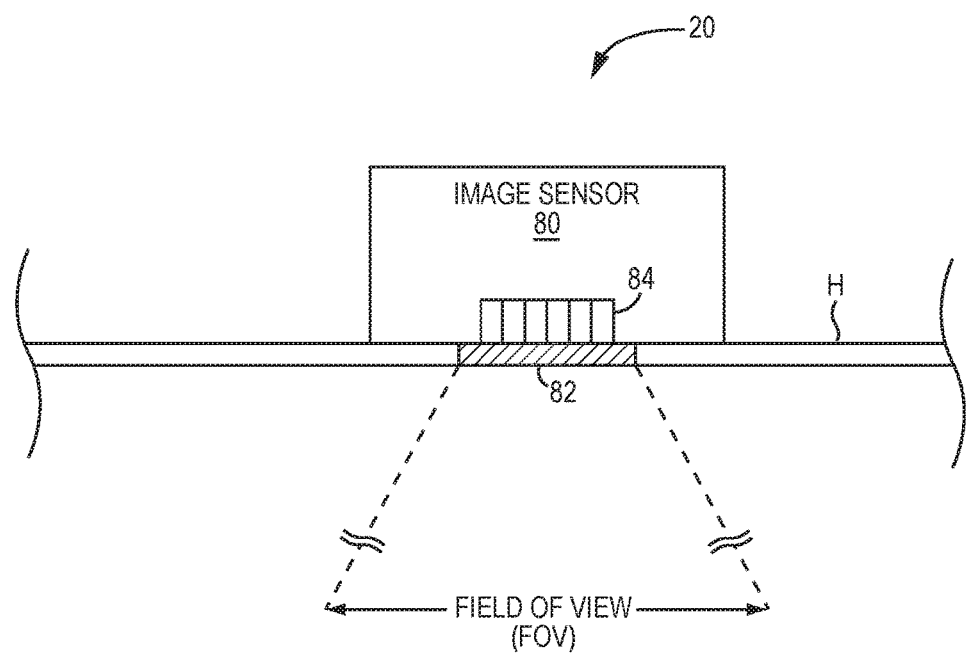
FIG. 15 illustrates an image module installed in a housing of a lighting fixture according to one embodiment of the disclosure.

With reference to FIG. 15, one embodiment of the ILM 20 is illustrated where an image sensor 80 is mounted just inside the housing H of the ILM 20. A lens 82 or opening is provided in the housing H such that the front surface of the lens 82 is flush with the front surface of the housing H. A pixel array 84 of the image sensor 80 is aligned with the lens 82 such that the pixel array 84 is exposed to a field of view through the lens 82.

Figure 16:
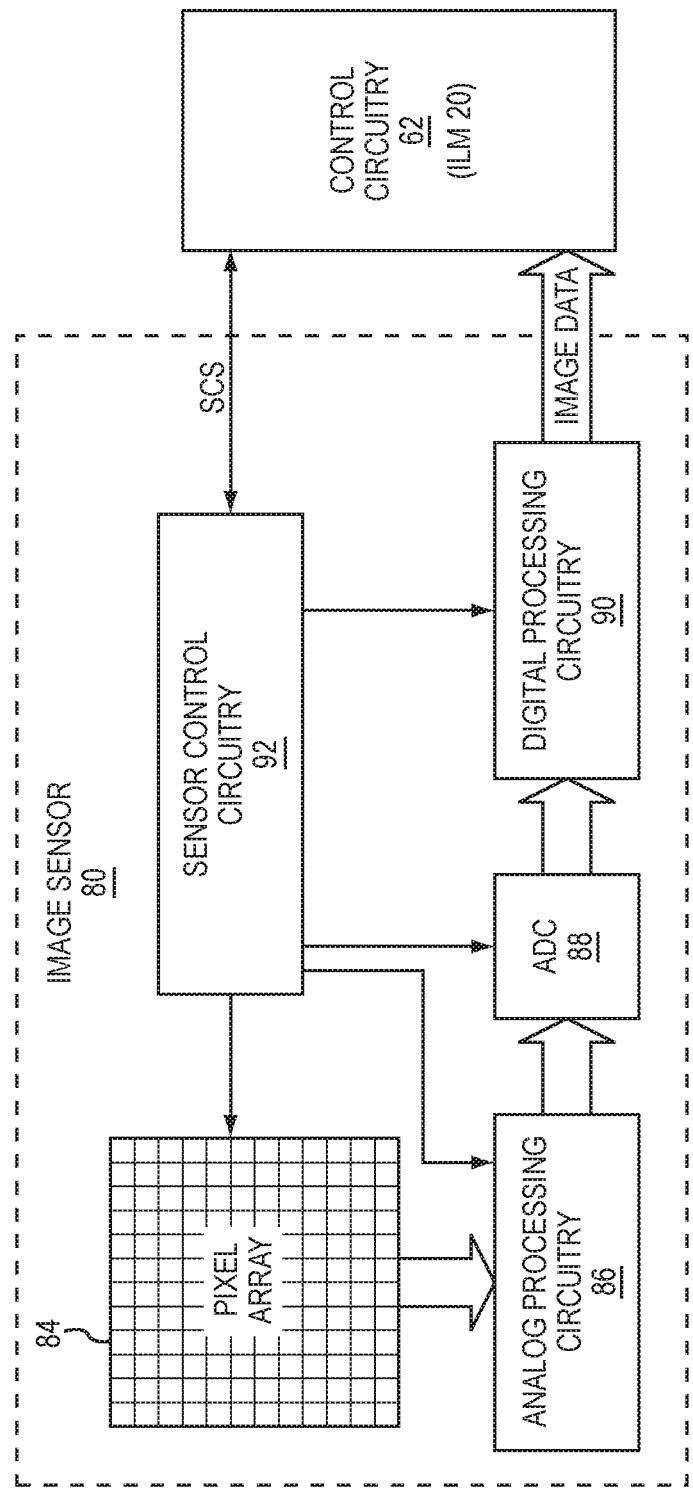
FIG. 16 illustrates an image sensor according to one embodiment of the disclosure.

An exemplary CMOS-based image sensor 80 is shown in FIG. 16. While a CMOS-based image sensor 80 is illustrated, those skilled in the art will appreciate that other types of image sensors 80, such as CCD-based sensors, may be employed. CMOS-based image sensors 80 are particularly useful in lighting applications because they have a broad spectral sensitivity that overlaps that of the human eye.

The image sensor 80 generally includes the pixel array 84, analog processing circuitry 86, an analog-to-digital converter (ADC) 88, digital processing circuitry 90, and sensor control circuitry 92. In operation, the pixel array 84 will receive an instruction to capture image information from the sensor control circuitry 92. In response, the pixel array 84 will transform the light that is detected at each pixel into an analog signal and pass the analog signals for each pixel of the pixel array 84 to the analog processing circuitry 86. The analog processing circuitry 86 will filter and amplify the analog signals to create amplified signals, which are converted to digital signals by the ADC 88. The digital signals are processed by the digital processing circuitry 90 to create image data. The image data is passed to the control circuitry 62 of the ILM 20 for analysis, storage, or delivery to another lighting fixture 10 or remote entity.

The sensor control circuitry 92 will cause the pixel array 84 to capture an image in response to receiving an instruction via a sensor control signal (SCS) from the ILM 20 or other remote entity. The sensor control circuitry 92 controls the timing of the image processing provided by the analog processing circuitry 86, ADC 88, and digital processing circuitry 90. The sensor control circuitry 92 also sets the image sensor's processing parameters, such as the gain and nature of filtering provided by the analog processing circuitry 86 as well as the type of image processing provided by the digital processing circuitry 90. These processing parameters may be dictated by information provided by the control circuitry 62 of the ILM 20. For additional information regarding image capture, reference is made to U.S. Pat. No. 9,686,477, which is incorporated herein by reference in its entirety.

Those skilled in the art will recognize improvements and modifications to the preferred embodiments of the present disclosure. All such improvements and modifications are considered within the scope of the concepts disclosed herein and the claims that follow.

What is claimed is:

1. A lighting fixture comprising:
    a communication interface;
    a light source configured to provide light output for general illumination;
    an image sensor configured to capture image information associated with a field of view; and
    control circuitry associated with the light source and the image sensor and configured to:
        provide a drive signal to the light source to control the light output;
        for each object in the field of view:
            determine if an object in the field of view is an occupant based on the image information; and
            if the object is the occupant, track movement of the occupant within the field of view;
        determine a number of occupants in the field of view; and
        provide occupancy information bearing on the number of occupants in the field of view to a remote entity via the communication interface.

2. The lighting fixture of claim 1 further comprising a secondary sensor associated with the control circuitry, wherein while tracking the movement of the occupant, the control circuitry is further configured to:
    determine if the occupant is lost from the field of view;
    when the occupant is lost from the field of view, check the secondary sensor for an indication of occupancy; and
    if there is the indication of occupancy, resume tracking of the movement of the occupant within the field of view.

3. The lighting fixture of claim 2 wherein if there is no indication of occupancy, communicate with at least one neighboring lighting fixture via the communication interface to determine if the occupant is in a field of view of the at least one neighboring lighting fixture.

4. The lighting fixture claim 3 wherein if the occupant is in the field of view of the at least one neighboring lighting fixture, communicate with the at least one neighboring lighting fixture via the communication interface to facilitate a handoff of tracking of the movement of the occupant to the at least one neighboring lighting fixture.

5. The lighting fixture claim 4 wherein the control circuitry is further configured to provide occupant information that relates to the occupant and is derived from the image information to the at least one neighboring lighting fixture via the communication interface in association with the handoff.

6. The lighting fixture claim 1 wherein while tracking the movement of the occupant, the control circuitry is further configured to:
    predict if the occupant is leaving the field of view; and
    if the occupant is predicted to be leaving the field of view, communicate with at least one neighboring lighting fixture via the communication interface to facilitate a handoff of tracking of the movement of the occupant to the at least one neighboring lighting fixture.

7. The lighting fixture of claim 6 wherein while tracking the movement of the occupant, the control circuitry is further configured to, if the occupant is not leaving the field of view, resume tracking of the movement of the occupant within the field of view.

8. The lighting fixture of claim 6 wherein to predict if the occupant is leaving the field of view, the control circuitry is configured to:
    determine at least one of a location of the occupant within the field of view, a direction of travel of the occupant, and a velocity of travel of the occupant; and use the at least one of the location of the occupant within the field of view, the direction of travel of the occupant, and the velocity of travel of the occupant to predict if the occupant is leaving the field of view.

9. The lighting fixture claim 6 wherein the control circuitry is further configured to provide occupant information that relates to the occupant and is derived from the image information to the at least one neighboring lighting fixture via the communication interface in association with the handoff.

10. The lighting fixture of claim 9 wherein the control circuitry is further configured to determine whether the object moving in the field of view is a previously tracked occupant, and if the object moving in the field of view is the previously tracked occupant, resume tracking of the previously tracked occupant.

11. The lighting fixture of claim 9 wherein the control circuitry detects motion in the field of view based on the image information.

12. The lighting fixture of claim 9 further comprising a secondary occupancy sensor that is not an image sensor, wherein the control circuitry detects motion in the field of view based on information provided by the secondary occupancy sensor.

13. The lighting fixture of claim 9 further comprising a secondary occupancy sensor that is not an image sensor, wherein the control circuitry detects motion in the field of view based on the image information and information provided by the secondary occupancy sensor.

14. The lighting fixture of claim 1 wherein the control circuitry is configured to track the movement of a plurality of occupants within the field of view at the same time.

15. The lighting fixture of claim 1 wherein:
the control circuitry is further configured to detect motion in the field of view caused by the object moving in the field of view; and
determination if the object in the field of view is the occupant is initiated after detecting the motion in the field of view.

16. The lighting fixture of claim 1 wherein the control circuitry is further configured to:
detect motion in the field of view caused by the object moving in the field of view;
determine whether the object moving in the field of view is a previously tracked occupant;
if the object moving in the field of view is the previously tracked occupant, resume tracking of the previously tracked occupant, wherein determining if the object in the field of view is the occupant is initiated when the object moving in the field of view is not the previously tracked occupant.

17. The lighting fixture of claim 1 wherein the drive signal provided to the light source is based, at least in part, on the image information.

18. The lighting fixture of claim 1 wherein while tracking the movement of the occupant, the control circuitry is further configured to determine at least one of a location of the occupant within the field of view, a direction of travel of the occupant, and a velocity of travel of the occupant based on the image information.

19. The lighting fixture of claim 1 wherein while tracking the movement of the occupant, the control circuitry is further configured to determine at least one characteristic of the occupant based on the image information.

20. The lighting fixture claim 1 wherein when the occupant is concurrently in the field of view of the image sensor and in a field of view of a neighboring lighting fixture, the control circuitry is further configured to coordinate with the neighboring lighting fixture to determine whether to account for the occupant in the occupancy information or have the neighboring lighting fixture account for the occupant as an occupant in the field of view of the neighboring lighting fixture.

21. A lighting fixture comprising:
a communication interface;
a light source configured to provide light output for general illumination;
an image sensor configured to capture image information associated with a field of view; and
control circuitry associated with the light source and the image sensor and configured to:
provide a drive signal to the light source to control the light output; and
for each object in the field of view:
detect an object moving in the field of view based on the image information;
determine if the object is an occupant;
track movement of the occupant within the field of view;
determine a number of occupants, including the occupant, in the field of view; and
provide occupancy information bearing on the number of occupants in the field of view to a remote entity via the communication interface.

* * * * *